United States Patent
Murayama et al.

(10) Patent No.: US 9,302,662 B2
(45) Date of Patent: Apr. 5, 2016

(54) BRAKE DEVICE

(71) Applicant: HONDA MOTOR CO., LTD., Minato-Ku, Tokyo (JP)

(72) Inventors: Kazuaki Murayama, Wako (JP); Jiro Suzuki, Wako (JP); Hirofumi Adachi, Wako (JP); Takaaki Ohnishi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 68 days.

(21) Appl. No.: 14/360,330

(22) PCT Filed: Nov. 21, 2012

(86) PCT No.: PCT/JP2012/080211
§ 371 (c)(1),
(2) Date: May 23, 2014

(87) PCT Pub. No.: WO2013/077366
PCT Pub. Date: May 30, 2013

(65) Prior Publication Data
US 2014/0319903 A1 Oct. 30, 2014

(30) Foreign Application Priority Data

Nov. 25, 2011 (JP) ................................ 2011-258109

(51) Int. Cl.
*B60T 13/16* (2006.01)
*B60T 7/04* (2006.01)
(Continued)

(52) U.S. Cl.
CPC ............... *B60T 13/165* (2013.01); *B60T 7/042* (2013.01); *B60T 8/368* (2013.01); *B60T 8/4081* (2013.01);
(Continued)

(58) Field of Classification Search
CPC ..... B30T 13/165; B30T 7/042; B30T 8/4081; B30T 11/20; B30T 11/30; B30T 13/145; B30T 13/146; B30T 17/222
USPC .......................................... 303/15, 20, 113.5
See application file for complete search history.

(56) References Cited

U.S. PATENT DOCUMENTS

| | | | |
|---|---|---|---|
| 4,159,755 A | 7/1979 | Kang et al. |
| 4,979,367 A | 12/1990 | Crescentini |

(Continued)

FOREIGN PATENT DOCUMENTS

| | | |
|---|---|---|
| CN | 201568477 U | 9/2010 |
| EP | 0664248 A1 | 7/1995 |

(Continued)

OTHER PUBLICATIONS

Extended European Search Report issued by the EPO dated Jun. 18, 2005 in regards to corresponding application No. EP 12 85 1062.

*Primary Examiner* — Melanie Torres Williams
(74) *Attorney, Agent, or Firm* — Carrier Blackman & Associates, P.C.; William D. Blackman; Joseph P. Carrier

(57) ABSTRACT

Provided is a vehicle brake system including a master cylinder which generates a master hydraulic pressure through an operation of a brake pedal by an operator, and a cylinder body which houses a first and second slave pistons driven by an electric motor operated in accordance with an operation amount of the brake pedal, and is formed with a first hydraulic chamber and a second hydraulic chamber for generating a slave hydraulic pressure through operations of the first and second slave pistons. Further, the cylinder body includes a first bleeder and a second bleeder which are configured to be switchable between open states in which a first hydraulic chamber and a second hydraulic chamber are in communication with an external of the cylinder body and closed states in which the first hydraulic chamber and the second hydraulic chamber are not in communication with the external of the cylinder body.

5 Claims, 8 Drawing Sheets

(51) Int. Cl.
*B60T 11/20* (2006.01)
*B60T 11/30* (2006.01)
*B60T 13/74* (2006.01)
*B60T 17/22* (2006.01)
*B60T 8/36* (2006.01)
*B60T 8/40* (2006.01)
*B60T 13/14* (2006.01)

(52) U.S. Cl.
CPC .............. *B60T 11/20* (2013.01); *B60T 11/30* (2013.01); *B60T 13/145* (2013.01); *B60T 13/146* (2013.01); *B60T 13/745* (2013.01); *B60T 17/222* (2013.01)

(56) References Cited

U.S. PATENT DOCUMENTS

| | | |
|---|---|---|
| 5,713,437 A | 2/1998 | Furukawa et al. |
| 6,796,339 B1 * | 9/2004 | Petty .................. B60T 17/222 141/59 |
| 2004/0074722 A1 | 4/2004 | Queval et al. |
| 2008/0079309 A1 | 4/2008 | Hatano et al. |
| 2012/0119566 A1 * | 5/2012 | Ohnishi .................. B60T 7/042 303/20 |
| 2012/0228924 A1 | 9/2012 | Hatano et al. |

FOREIGN PATENT DOCUMENTS

| | | |
|---|---|---|
| EP | 1795419 A2 | 6/2007 |
| JP | S47-2578 B | 1/1972 |
| JP | S57-174163 U | 11/1982 |
| JP | 2008-087619 A | 4/2008 |
| JP | 2010-023594 A | 2/2010 |
| JP | 2012056450 A * | 3/2012 |

* cited by examiner

BRAKE DEVICE

TECHNICAL FIELD

The present invention relates to a vehicle brake device for generating a brake hydraulic pressure by a rotational driving force of an electric motor when a brake operation unit is operated.

BACKGROUND ART

There has been well known a vehicle brake system including a booster for boosting a depression force when a brake pedal is depressed, for example, Patent Document 1 discloses a vehicle brake system (an electric brake actuator) using an electric motor as a boost source. The vehicle brake system disclosed in Patent Document 1 includes an axis member moving back and forth through an operation of the brake pedal as a main piston, and a cylindrical member being fitted on the axis member (main piston) as a booster piston, and is configured to boost the depression force by generating a brake hydraulic pressure with a thrust inputted from the brake pedal to the axis member (main piston) and a thrust applied by the electric motor to the cylindrical member (booster piston).

CITATION LIST

Patent Literature

{Patent Document 1}
Japanese Patent Application Publication No. 2010-023594

SUMMARY OF INVENTION

Technical Problem

However, in the brake device (vehicle brake system) disclosed in Patent Document 1, a pressure chamber of the master cylinder filled with a brake fluid and a housing (an actuator housing) including a housing part of a ball screw mechanism have hermetic structures. Therefore, if an air is mixed into the brake fluid for generating the brake hydraulic pressure, for example, during production of the brake device, and the air remains in the pressure chamber for generating the brake hydraulic pressure, there is a problem that the air cannot be easily released.

There is also a brake device which is, for example, configured to drive the electric brake actuator by supplying power, and send out the air mixed into the brake fluid to a brake mechanism, and then release the air from an air release mechanism (a bleeder) formed in the brake mechanism, when the air is mixed into the brake fluid filled in a hydraulic system (including the pressure chamber). In a case of a disc brake mechanism, it is known that the disc brake mechanism is configured such that the caliper for generating a braking force by pressing brake pads to a brake disc is formed with the bleeder. Therefore, for an operation of releasing the air which is mixed into the brake fluid of the brake device provided with the electric brake actuator and is remaining in the pressure chamber, an operation to supply power to the electric brake actuator and an operation to send out the air in the pressure chamber to the brake device (the caliper or the like) by driving the electric brake actuator are required, and thus it is not easy to release the air remaining in the pressure chamber.

Therefore, an object of the present invention is to provide a vehicle brake device capable of easily releasing the air remaining in the pressure chamber which generates the brake hydraulic pressure.

Solution to Problem

In order to solve the above problem, a brake device according to the present invention includes a master cylinder that generates a brake hydraulic pressure in accordance with an operation amount of a brake operation unit by an operator, a slave cylinder that houses a hydraulic control piston operated by a driving force of an electric motor to be driven in accordance with the operation amount of the brake operation unit, and has a cylinder body formed with a brake hydraulic chamber for generating a brake hydraulic pressure through an operation of the hydraulic control piston, and a hydraulic system that connects, to the slave cylinder, a wheel cylinder for generating a braking force by the brake hydraulic pressure generated in the master cylinder or by the brake hydraulic pressure generated in the slave cylinder. Further, the brake device is characterized in that the cylinder body includes an air release mechanism which is configured to be switchable between an open state in which the brake hydraulic chamber is in communication with an external of the cylinder body and a closed state in which the brake hydraulic chamber is not in communication with the external of the cylinder body.

According to the present invention, the air remaining in the brake hydraulic chamber can be released from the air release mechanism included in the cylinder body. Therefore, even in a state that an ignition switch is turned off and the hydraulic control piston cannot be driven by the electric motor, the air remaining in the brake hydraulic chamber can be released.

The brake device according to the present invention is characterized in that the hydraulic system is composed of two hydraulic systems, the hydraulic control piston includes a first slave piston and a second slave piston which are connected in series, the brake hydraulic chamber includes a first hydraulic chamber which generates a brake hydraulic pressure through an operation of the first slave piston and supplies the brake hydraulic pressure to one of the hydraulic systems, and a second hydraulic chamber which generates a brake hydraulic pressure through an operation of the second slave piston and supplies the brake hydraulic pressure to the other of the hydraulic systems, and the air release mechanism includes a first air release mechanism which is switchable between the closed state and the open state of the first hydraulic chamber, and a second air release mechanism which is switchable between the closed state and the open state of the second hydraulic chamber.

According to the present invention, even if the slave cylinder of a tandem type in which two hydraulic control piston are connected in series is configured to have two hydraulic chambers, the air can be appropriately released from the two hydraulic chambers.

Further, the brake device according to the present invention is characterized in that a reservoir for storing the brake fluid to be supplied to the brake hydraulic chamber is disposed above the air release mechanism, and the reservoir has a shape with a notch over the air release mechanism.

According to the present invention, even if the reservoir is configured to be disposed above the air release mechanism, a space over the air release mechanism is not covered with the reservoir. Therefore, an open space can be formed over the air release mechanism and facilitate the operation of releasing air from the air release mechanism.

Further, the brake device according to the present invention is characterized in that the slave cylinder is disposed to be shifted to one side of a left side and a right side in a power plant housing chamber of a vehicle, and the air release mechanism is formed on the other side of the left side and the right side of the cylinder body.

According to the present invention, when the slave cylinder is disposed to be shifted to one side of either the left side or the right side in a power plant housing chamber, the air release mechanism can be formed on the side opposite to the side where the slave cylinder is shifted. Therefore, it is possible to secure a wide working space for the operation of releasing the air from the air release mechanism.

Further, the brake device according to the present invention is characterized in that the pressure in the brake hydraulic chamber is boosted by supplying the brake hydraulic pressure generated in the master cylinder to the brake hydraulic chamber, and the air remaining in the brake hydraulic chamber with the air release mechanism in an open state is released to the external of the cylinder body from the air release mechanism.

According to the present invention, the brake hydraulic chamber can be boosted by supplying the brake hydraulic pressure generated in the master cylinder through an operation of the brake operation unit to the brake hydraulic chamber, and further, the remaining air can be pushed out from the air release mechanism of the brake hydraulic chamber and released to the external of the cylinder body. Therefore, the air remaining in the brake hydraulic chamber can be effectively released.

Advantageous Effects of Invention

According to the present invention, it is possible to provide a vehicle brake device capable of easily releasing the air remaining in the pressure chamber of the slave cylinder which generates the brake hydraulic pressure.

DESCRIPTION OF EMBODIMENTS

Figure 1:
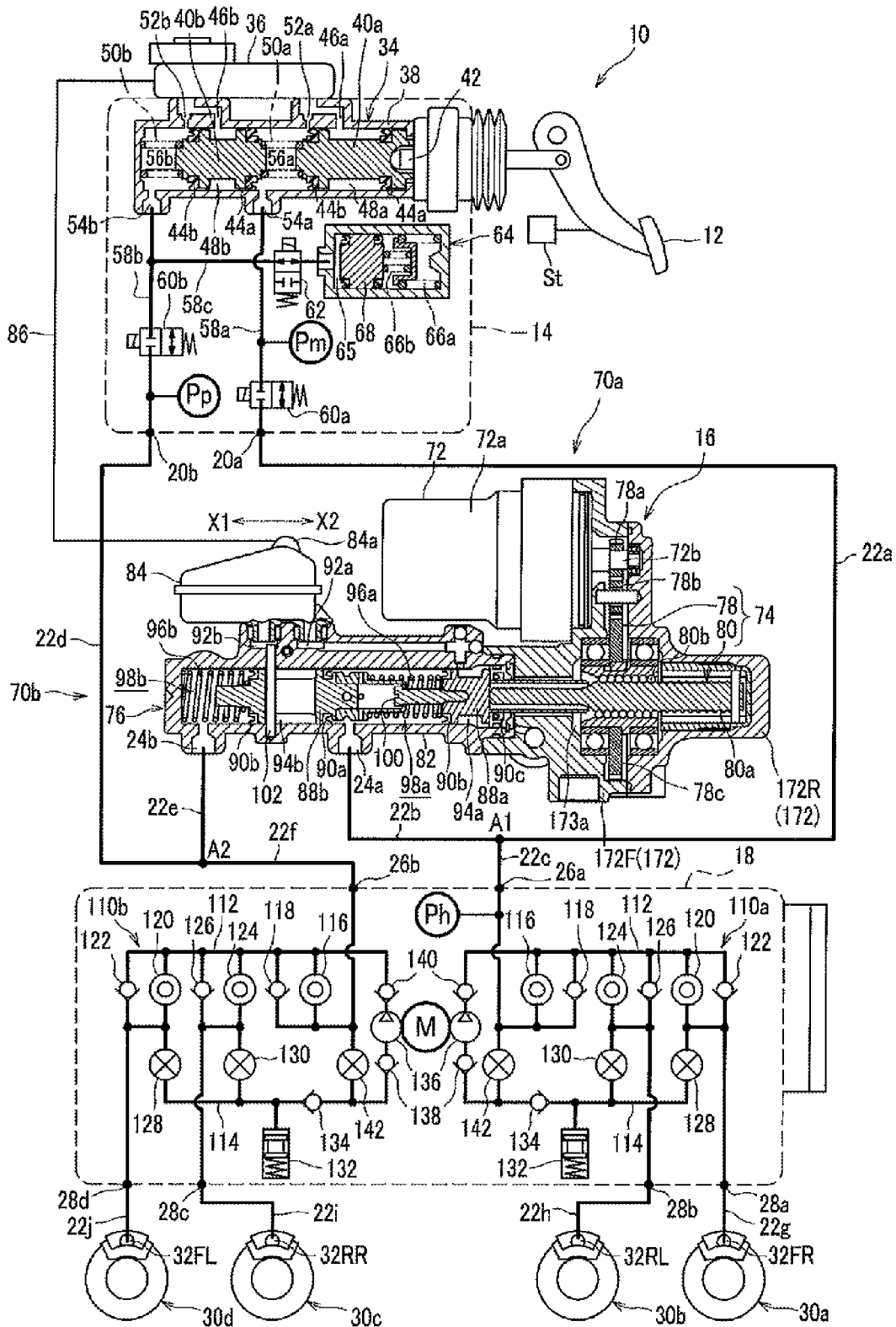
FIG. 1 is a block diagram of a vehicle brake system including an electric brake device according to an embodiment of the present invention.

Hereinafter, an embodiment according to the present invention will be described in detail with reference to accompanying drawings. FIG. 1 is a schematic block diagram of a vehicle brake system including an electric brake device according to the embodiment of the present invention.

A vehicle brake system (brake device) 10 shown in FIG. 1 is configured to include both of a by-wire brake system which actuates a brake by transmitting an electrical signal for a normal use, and a conventional hydraulic brake system which actuates the brake by transmitting a hydraulic pressure for a fail-safe use.

Hence, as shown in FIG. 1, the vehicle brake system 10 is basically configured to include, as separate units, an input device 14 into which an operation is inputted when a brake operation unit such as a brake pedal 12 is operated by an operator, a pedal stroke sensor St which detects an operation amount (a stroke) when the brake pedal 12 is depressed, a slave cylinder (an electric brake device) 16 which controls (generates) a slave hydraulic pressure as a brake hydraulic pressure (second brake hydraulic pressure), and a vehicle behavior stabilizing device 18 (hereinafter, referred to as a VSA (Vehicle Stability Assist) device 18, VSA; registered trademark) which assists stabilization of a vehicle behavior.

These input device 14, electric brake device 16, and VSA device 18 are, for example, connected with one another through hydraulic paths made of pipe materials such as a hose or a tube, while the input device 14 and the electric brake device 16 are electrically connected with each other through an unillustrated harness, as the by-wire brake system.

Among these, the hydraulic paths will be described. With reference to a connection point A1 (slightly below center) in FIG. 1, one connection port 20a of the input device 14 and the connection point A1 are connected through a first piping tube 22a, and an output port 24a of the electric brake device 16 and the connection point A1 are connected through a second piping tube 22b, and further, an inlet port 26a of the VSA device 18 and the connection point A1 are connected through a third piping tube 22c.

With reference to another connection point A2 in FIG. 1, the other connection port 20b of the input device 14 and the connection point A2 are connected through a fourth piping tube 22d, and another output port 24b of the electric brake device 16 and the connection point A2 are connected through a fifth piping tube 22e, and further, another inlet port 26b of the VSA device 18 and the connection point A2 are connected through a sixth piping tube 22f.

The VSA device 18 is provided with a plurality of outlet ports 28a to 28d. A first outlet port 28a is connected to a wheel cylinder 32FR of a disk brake mechanism 30a provided on a front right wheel through a seventh piping tube 22g. A second outlet port 28b is connected to a wheel cylinder 32RL of a disk brake mechanism 30b provided on a rear left wheel through an eighth piping tube 22h. A third outlet port 28c is connected to a wheel cylinder 32RR of a disk brake mechanism 30c provided on a rear right wheel through a ninth piping tube 22i. A fourth outlet port 28d is connected to a wheel cylinder 32FL of a disk brake mechanism 30d provided on a front left wheel through a tenth piping tube 22j.

In this case, a brake fluid is supplied to each of the wheel cylinders 32FR, 32RL, 32RR, and 32FL of the disk brake mechanisms 30a to 30d through the piping tubes 22g to 22j connected to each of the output ports 28a to 28d. Each of the wheel cylinders 32FR, 32RL, 32RR, and 32FL is actuated upon an increase of the hydraulic pressure in each of the wheel cylinders 32FR, 32RL, 32RR, and 32FL, and thus a braking force is applied to the corresponding wheels (the front right wheel, the rear left wheel, the rear right wheel, and the front left wheel).

The vehicle brake system 10 is mountable on various vehicles including, for example, a vehicle driven only by an engine (internal combustion engine), a hybrid vehicle, an electric vehicle, and a fuel cell electric vehicle. Further, the vehicle brake system 10 is mountable on vehicles of all driving types such as front-wheel-drive, rear-wheel-drive, and four-wheel-drive without limiting the driving type.

The input device 14 includes a tandem-type master cylinder 34 capable of generating the hydraulic pressure in accordance with an operation of the brake pedal 12 by the operator, and a first reservoir 36 attached to the master cylinder 34. In a cylinder tube 38 of the master cylinder 34, two pistons 40a, 40b, which are spaced by a predetermined distance from each other in an axial direction of the cylinder tube 38, are disposed slidably. One piston 40a is disposed in close proximity to the brake pedal 12, and connected to the brake pedal 12 via a push rod 42. Further, the other piston 40b is disposed farther from the brake pedal 12 than the piston 40a.

On outer peripheral surfaces of this one and the other pistons 40a, 40b, a pair of cup seals 44a, 44b is mounted respectively via annular step portions. Back chambers 48a, 48b respectively communicating with supply ports 46a, 46b to be described later, are formed between the pair of cup seals 44a, 44b. Further, one spring member 50a is disposed between the one and the other pistons 40a, 40b, and the other spring member 50b is disposed between the other piston 40b and a side end portion of the cylinder tube 38. Note that, the pair of cup seals 44a, 44b may be configured to be attached to an inner wall of the cylinder tube 38.

The cylinder tube 38 of the master cylinder 34 is provided with the two supply ports 46a, 46b, two relief ports 52a, 52b, and two output ports 54a, 54b. In this case, each supply port 46a (46b) and each relief port 52a (52b) are provided so as to respectively join together to be in communication with an unillustrated reservoir chamber in the first reservoir 36.

Further, a first pressure chamber 56b and a second pressure chamber 56a, which generate a master hydraulic pressure as a brake hydraulic pressure (first brake hydraulic pressure) in accordance with a depression force applied to the brake pedal 12 by the operator, are provided in the cylinder tube 38 of the master cylinder 34. The second pressure chamber 56a is provided to be in communication with the connection port 20a via a second hydraulic path 58a, and the first pressure chamber 56b is provided to be in communication with the other connection port 20b via a first hydraulic path 58b.

Between the master cylinder 34 and the connection port 20a, a pressure sensor Pm is provided on the upstream side of the second hydraulic pressure path 58a, while a second shut-off valve 60a made of a normally open type solenoid valve is provided on the downstream side of the second hydraulic pressure path 58a. The pressure sensor Pm is adapted to detect the hydraulic pressure on the upstream side closer to the master cylinder 34 than the second shut-off valve 60a on the second hydraulic pressure path 58a.

Between the master cylinder 34 and the other connection port 20b, a first shut-off valve 60b made of a normally open type solenoid valve is provided on the upstream side of the first hydraulic pressure path 58b, while a pressure sensor Pp is provided on the downstream side of the first hydraulic pressure path 58b. The pressure sensor Pp is adapted to detect the hydraulic pressure on the downstream side closer to the wheel cylinders 32FR, 32RL, 32RR, and 32FL than the first shut-off valve 60b on the first hydraulic pressure path 58b.

The term "normally open" of the first shut-off valve 60b and the second shut-off valve 60a means that a normal position (a valving element position when not energized) of the valve is in a state of an open position (normally open). Note that, in FIG. 1, the first shut-off valve 60b and the second shut-off valve 60a respectively shows a closed valve state in which a solenoid is energized to actuate an unillustrated valving element.

On the first hydraulic path 58b between the master cylinder 34 and the first shut-off valve 60b, a branch hydraulic path 58c bifurcated from the second hydraulic path 58b is provided, and a third shut-off valve 62 made of a normally closed type solenoid valve and a stroke simulator 64 are connected in series to the branch hydraulic path 58c. The term "normally closed" of the third shut-off valve 62 means that a normal position (a valving element position when not energized) of the valve is in a state of a closed position (normally closed). Note that, in FIG. 1, the third shut-off valve 62 shows an open valve state in which a solenoid is energized to actuate an unillustrated valving element.

The stroke simulator 64 is a device which makes the operator feel as if the braking force is generated in accordance with the depression force by generating a reaction force against a stroke of the brake pedal 12 at the time of by-wire control, and is disposed on the master cylinder 34 side from the first shut-off valve 60b on the first hydraulic path 58b. The stroke simulator 64 is provided with a hydraulic chamber 65 which is in communication with the branch hydraulic path 58c, and is provided so as to be capable of absorbing the brake fluid which is derived from the first pressure chamber 56b of the master cylinder 34 via the hydraulic chamber 65.

The stroke simulator 64 includes a first return spring 66a having a high spring constant, a second return spring 66b having a low spring constant, which are arranged in series with each other, and a simulator piston 68 which is urged by the first and second return springs 66a, 66b. Further, the stroke simulator 64 is provided such that an operation feeling for the brake pedal 12 is equivalent to the operation feeling when depressing a conventional master cylinder 34 by setting an increasing gradient of the pedal reaction force to be low in the former period of depression of the brake pedal 12, and by setting the pedal reaction force to be high in the latter period of depression of the brake pedal 12.

The hydraulic paths are roughly composed of a second hydraulic system 70a and a first hydraulic system 70b. The second hydraulic system 70a connects the second pressure chamber 56a of the master cylinder 34, a second hydraulic chamber 98a of the electric brake device 16, and the plurality of wheel cylinders 32FR, 32RL. The first hydraulic system 70b connects the first pressure chamber 56b of the master cylinder 34, a first hydraulic chamber 98b of the electric brake device 16, and the plurality of wheel cylinders 32RR, 32FL. The second hydraulic chamber 98a and the first hydraulic chamber 98b of the electric brake device 16 will be described in detail later.

The second hydraulic system 70a includes the second hydraulic path 58a which connects the output port 54a of the master cylinder 34 (cylinder tube 38) in the input device 14 to the connection port 20a, the piping tubes 22a, 22b which connect the connection port 20a of the input device 14 to the output port 24a of the electric brake device 16, the piping tube 22b, 22c which connect the output port 24a of the electric brake device 16 to the inlet port 26a of the VSA device 18, and the piping tubes 22g, 22h which connect the outlet ports 28a, 28b of the VSA device 18 to the wheel cylinders 32FR, 32RL, respectively. Hence, the second hydraulic system 70a connects the wheel cylinders 32FR, 32RL to the master cylinder 34 and the electric brake device 16.

The first hydraulic system 70b includes the first hydraulic path 58b which connects the output port 54b of the master cylinder 34 (cylinder tube 38) in the input device 14 to the other connection port 20b, the piping tubes 22d, 22e which connect the other connection port 20b of the input device 14 to the output port 24b of the electric brake device 16, the piping tube 22e, 22f which connect the output port 24b of the electric brake device 16 to the inlet port 26b of the VSA device 18, and the piping tubes 22i, 22j which connect the outlet ports 28c, 28d of the VSA device 18 to the wheel cylinders 32RR, 32FL, respectively. Hence, the first hydraulic system 70b connects the wheel cylinders 32RR, 32FL to the master cylinder 34 and the electric brake device 16.

The electric brake device 16 has an actuator mechanism 74 including a motor (an electric motor 72), and a cylinder mechanism 76 which is urged by the actuator mechanism 74.

The actuator mechanism 74 is disposed on an output shaft 72b side of the electric motor 72, and has a gear mechanism (a deceleration mechanism) 78 and a ball screw structure 80. The gear mechanism 78 transmits a rotational driving force of the electric motor 72 by meshing a plurality of gears, and the ball screw structure 80 includes a ball screw shaft 80a and balls 80b which move back and forth in the axial direction by transmitting the rotational driving force via the gear mechanism 78. In the present embodiment, the ball screw structure 80 is housed in a mechanism housing portion 173a of an actuator housing 172 together with the gear mechanism 78.

The cylinder mechanism 76 has a substantially cylindrical cylinder body 82 and a reserve tank (second reservoir 84) attached to the cylinder body 82. An inlet port 84a of the second reservoir 84 is connected to the first reservoir 36 attached to the master cylinder 34 of the input device 14 via a piping tube 86, and is provided such that the brake fluid stored in the first reservoir 36 is supplied to the second reservoir 84 via the piping tube 86 and the inlet port 84a. Note that, the piping tube 86 may be provided with a tank which stores the brake fluid. The open end of the cylinder body 82 having a substantially cylindrical shape is fitted into the actuator housing 172 composed of a housing body 172F and a housing cover 172R, and thus the cylinder body 82 and the actuator housing 172 is connected with each other, to construct the electric brake device 16. The construction of the actuator housing 172, and a connecting portion of the cylinder body 82 and the actuator housing 172 will be described in detail later.

In the cylinder body 82, two hydraulic control pistons (a second slave piston 88a and a first slave piston 88b), which are connected in series and separated by a predetermined distance in an axial direction of the cylinder body 82, are arranged slidably. The second slave piston 88a is disposed in close proximity to the ball screw structure 80 side, to come into contact with one end portion of the ball screw shaft 80a, and is displaced integrally with the ball screw shaft 80a in the direction of an arrow X1 or an arrow X2. Further, the first slave piston 88b is disposed farther from the ball screw structure 80 side than the second slave piston 88a.

The electric motor 72 according to the present embodiment is configured to be covered with a motor casing 72a which is formed separately from the cylinder body 82, and is disposed such that the output shaft 72b is substantially in parallel with the sliding direction (axial direction) of the second slave piston 88a and first slave piston 88b. That is, the electric motor 72 is disposed such that the axial direction of the output shaft 72b is substantially in parallel with the direction of the hydraulic control pistons. Further, it is configured such that the rotational driving of the output shaft 72b is transmitted to the ball screw structure 80 via the gear mechanism 78.

The gear mechanism 78 is, for example, composed of three gears, which are a first gear 78a, a third gear 78c, and a second gear 78b. The first gear is attached to the output shaft 72b of the electric motor 72, the third gear 78c rotates the balls 80b, which make the ball screw shaft 80a move back and forth in the axial direction, around the axis of the ball screw shaft 80a, and the second gear 78b transmits a rotation of the first gear 78a to the third gear 78c. Further, the third gear 78c rotates around the axis of the ball screw shaft 80a. Therefore, the rotation axis of the third gear 78c is the ball screw shaft 80a, and is substantially in parallel with the sliding direction (axial direction) of the hydraulic control pistons (the second slave piston 88a and the first slave piston 88b). As described above, since the output shaft 72b of the electric motor 72 and the axial direction of the hydraulic control pistons are substantially in parallel with each other, the output shaft 72b of the electric motor 72 and the rotation axis of the third gear 78c are substantially in parallel with each other.

By constructing the rotation axis of the second gear 78b substantially in parallel with the output shaft 72b of the electric motor 72, the output shaft 72b of the electric motor 72, the rotation axis of the second gear 78b, and the rotation axis of the third gear 78c are disposed substantially in parallel with one another. By the structure described above, the actuator mechanism 74 according to the present embodiment converts the rotational driving force of the output shaft 72b of the electric motor 72 into a reciprocating driving force (linear driving force) of the ball screw shaft 80a. The second slave piston 88a and the first slave piston 88b are driven by the ball screw shaft 80a, and thus the actuator mechanism 74 converts the rotational driving force of the output shaft 72b of the electric motor 72 into the linear driving force of the hydraulic control pistons (the second slave piston 88a and the first slave piston 88b). In addition, the reference numeral 173a denotes the mechanism housing portion which houses the ball screw structure 80.

On the outer peripheral surface of the first slave piston 88b, via annular step portions, a pair of slave cup seals 90a, 90b is respectively mounted. Between the pair of slave cup seals 90a, 90b, a first back chamber 94b which is in communication with a reservoir port 92b to be described later is formed. Note that, between the second slave piston 88a and the first slave piston 88b, a second return spring 96a is provided, and between the side end portion of the cylinder body 82 and the first slave piston 88b, a first return spring 96b is provided.

An annular guide piston 90c, which liquid-tightly seals a gap between the mechanism housing portion 173a and the outer peripheral surface of the second slave piston 88a, and guides the second slave piston 88a movably in the axial direction, is provided behind the second slave piston 88a so as to close the cylinder body 82 as a seal member. A gap between the second slave piston 88a and the guide piston 90c is preferably sealed liquid-tightly by mounting an unillustrated slave cup seal on the inner peripheral surface of the guide piston 90c into which the second slave piston 88a penetrates. Further, on the outer peripheral surface of the front portion of the second slave piston 88a, a slave cup seal 90b is mounted via an annular step portion. With this configuration, the brake fluid filled in the cylinder body 82 is sealed in the cylinder body 82 by the guide piston 90c, and does not flow into the side of the actuator housing 172. Note that, between the guide piston 90c and the slave cup seal 90b, a second back chamber 94a, which is in communication with a reservoir port 92a to be described later, is formed.

In the cylinder body 82 of the cylinder mechanism 76, two reservoir ports 92a, 92b and two output ports 24a, 24b are provided. In this case, the reservoir port 92a (92b) is provided so as to be in communication with an unillustrated reservoir chamber in the second reservoir 84.

Further, in the cylinder body 82, one brake hydraulic chamber (the second hydraulic chamber 98a) and the other brake hydraulic chamber (the first hydraulic chamber 98b) are provided. The second hydraulic chamber 98a controls a slave hydraulic pressure which is outputted from the output port 24a to the wheel cylinders 32FR, 32RL side, and the first hydraulic chamber 98b controls a slave hydraulic pressure which is outputted from the other output port 24b to the wheel cylinders 32RR, 32FL side. The slave hydraulic pressure which is controlled (generated) in the second hydraulic chamber 98a is supplied to the second hydraulic system 70a via the second piping tube 22b, and the slave hydraulic pressure which is controlled (generated) in the first hydraulic chamber 98b is supplied to the first hydraulic system 70b via the fifth piping tube 22e.

With this configuration, the second back chamber 94a, the first back chamber 94b, the second hydraulic chamber 98a, and the first hydraulic chamber 98b, in which the brake fluid is sealed, constitute a brake fluid sealing portion in the cylinder body 82, and are partitioned liquid-tightly (hermetically) from the mechanism housing portion 173a of the actuator housing 172 by the guide piston 90c which functions as a seal member. Note that, a method of attaching the guide piston 90c to the cylinder body 82 is not limited thereto, for example, it may be configured to be attached by an unillustrated circlip.

Between the second slave piston 88a and the first slave piston 88b, a regulation unit 100 for regulating maximum strokes (maximum displacement distances) and minimum strokes (minimum displacement distances) of the second slave piston 88a and the first slave piston 88b is provided. Further, on the first slave piston 88b, a stopper pin 102 for regulating a sliding range of the first slave piston 88b to prevent over-return to the second slave piston 88a side is provided. By the stopper pin 102, when one system fails, a failure in the other system is prevented, particularly during backup time when braking by the master cylinder 34.

The VSA device 18 is composed of well known components, and has a second brake system 110a for controlling the second hydraulic system 70a connected to the disk brake mechanisms 30a, 30b (the wheel cylinders 32FR, 32RL) of the front right wheel and the rear left wheel, and a first brake system 110b for controlling the first hydraulic system 70b connected to the disk brake mechanisms 30c, 30d (the wheel cylinders 32RR, 32FL) of the rear right wheel and the front left wheel. Here, the second brake system 110a may be a hydraulic system connected to the disk brake mechanisms provided on the front left wheel and the front right wheel, and the first brake system 110b may be a hydraulic system connected to the disk brake mechanisms provided on the rear right wheel and the rear left wheel. Further, the second brake system 110a may be a hydraulic system connected to the disk brake mechanisms provided on the front right wheel and the rear right wheel on one side of the vehicle body, and the first brake system 110b may be a hydraulic system connected to the disk brake mechanisms provided on the front left wheel and the rear left wheel on the other side of the vehicle body.

Since the second brake system 110a and the first brake system 110b have the same structures with each other, those corresponding to each other in the second brake system 110a and in the first brake system 110b are given the same reference numerals, while descriptions will be focused on the second brake system 110a, and descriptions of the first brake system 110b will be appended in parentheses.

The second brake system 110a (the first brake system 110b) has a first common hydraulic path 112 and a second common hydraulic path 114, which are common to the wheel cylinders 32FR, 32RL (32RR, 32FL). The VSA device 18 includes a regulator valve 116, a first check valve 118, a first inlet valve 120, a second check valve 122, a second inlet valve 124, and a third check valve 126. The regulator valve 116 is made of a normally open type solenoid valve disposed between an inlet port 26a and the first common hydraulic path 112. The first check valve 118 is disposed in parallel with the regulator valve 116, and allows the brake fluid to flow from the inlet port 26a side to the side of the first common hydraulic path 112 (prevents the brake fluid from flowing to the inlet port 26a side from the side of the first common hydraulic path 112). The first inlet valve 120 is made of a normally open type solenoid valve disposed between the first common hydraulic path 112 and the first output port 28a. The second check valve 122 is disposed in parallel with the first inlet valve 120, and allows the brake fluid to flow from the first output port 28a side to the side of the first common hydraulic path 112 (prevents the brake fluid from flowing to the first output port 28a side from the side of the first common hydraulic path 112). The second inlet valve 124 is made of a normally open type solenoid valve disposed between the first common hydraulic path 112 and the second output port 28b. The third check valve 126 is disposed in parallel with the second inlet valve 124, and allows the brake fluid to flow from the second output port 28b side to the side of the first common hydraulic path 112 (prevents the brake fluid from flowing to the second output port 28b side from the side of the first common hydraulic path 112).

Further, the VSA 18 includes a first outlet valve 128, a second outlet valve 130, a reservoir 132, a fourth check valve 134, a pump 136, an intake valve 138, a discharge valve 140, a motor M, and a suction valve 142. The first outlet valve 128 is made of a normally closed type solenoid valve disposed between the first output port 28a and the second common hydraulic path 114. The second outlet valve 130 is made of a normally closed type solenoid valve disposed between the second output port 28b and the second common hydraulic path 114. The reservoir 132 is connected to the second common hydraulic path 114. The fourth check valve 134 is disposed between the first common hydraulic path 112 and the second common hydraulic path 114, and allows the brake fluid to flow from the second common hydraulic path 114 side to the first common hydraulic path 112 side (prevents the brake fluid from flowing to the second common hydraulic path 114 side from the first common hydraulic path 112 side). The pump 136 is disposed between the fourth check valve 134 and the first common hydraulic path 112, and supplies the brake fluid from the second common hydraulic path 114 side to the first common hydraulic path 112 side. The intake valve 138 and the discharge valve 140 are disposed respectively before and after the pump 136 driven by the motor M. The suction valve 142 is made of a normally closed type solenoid valve disposed between the second common hydraulic path 114 and the inlet port 26a.

Note that, in the second brake system 110a, on a hydraulic path adjacent to the inlet port 26a, a pressure sensor Ph for detecting the slave hydraulic pressure which is outputted from the output port 24a of the electric brake device 16 and controlled in the second hydraulic chamber 98a of the electric brake device 16, is provided. Detection signals detected by each of the pressure sensors Pm, Pp, and Ph are introduced into an unillustrated control unit. Further, the VSA device 18 is capable of performing ABS (Antilock Brake System) control, in addition to VSA control. Furthermore, in place of the VSA device 18, an ABS device equipped with only ABS function may be configured to be connected. The vehicle brake system 10 according to the present embodiment is basically configured as described above, and the operation and effect will be described in the following.

In a normal state where the vehicle brake system 10 works properly, the first shutoff valve 60b and the second shutoff valve 60a made of normally open type solenoid valves are in the closed valve state by energization, and the third shutoff valve 62 made of a normally closed type solenoid valve is in the open valve state by energization. Therefore, since the second hydraulic system 70a and the first hydraulic system 70b are shut off by the second shutoff valve 60a and the first shutoff valve 60b, the master hydraulic pressure generated by the master cylinder 34 of the input device 14 is not transmitted to the wheel cylinders 32FR, 32RL, 32RR, 32FL of the disk brake mechanisms 30a to 30d.

In this case, the master hydraulic pressure generated in the first pressure chamber 56b of the master cylinder 34 is transmitted to the hydraulic chamber 65 of the stroke simulator 64 via the branch hydraulic path 58c and the third shutoff valve 62 in the open valve state. By the master hydraulic pressure supplied to the hydraulic chamber 65, the simulator piston 68 is displaced against the spring force of the first and second return springs 66a, 66b, and thus a stroke of the brake pedal 12 is allowed while a pseudo-pedal reaction force is generated and applied to the brake pedal 12. As a consequence, a brake feeling which is not uncomfortable for the operator is obtained.

In such a system state, upon detecting the depression of the brake pedal 12 by the operator, the unillustrated control unit drives the electric motor 72 of the electric brake device 16 to urge the actuator mechanism 74, and displaces the second slave piston 88a and the first slave piston 88b toward the direction of the arrow X1 in FIG. 1, against the spring forces of the second return spring 96a and the first return spring 96b. By the displacement of the second slave piston 88a and the first slave piston 88b, the brake hydraulic pressure in the second hydraulic chamber 98a and the brake hydraulic pressure in the first hydraulic chamber 98b are pressurized so as to be balanced with each other, and thus an intended slave hydraulic pressure is generated.

Specifically, the unillustrated control unit calculates a depression operation amount of the brake pedal 12 in accordance with a detected value of the pedal stroke sensor St, and sets a brake hydraulic pressure (target hydraulic pressure) which is a target in consideration of a regenerative braking force on the basis of the depression operation amount (brake operation amount), and then generates the slave hydraulic pressure which is the set brake hydraulic pressure in the electric brake device 16. The slave hydraulic pressure generated in the electric brake device 16 is then supplied to the VSA device 18 from the inlet ports 26a, 26b. That is, the electric brake device 16 is a device which drives the second slave piston 88a and the first slave piston 88b by the rotational driving force of the electric motor 72 to be rotationally driven by the electrical signal when the brake pedal 12 is operated, and generates the slave hydraulic pressure (second brake hydraulic pressure) in accordance with the operation amount of the brake pedal 12, and then supply the generated slave hydraulic pressure to the VSA device 18. Further, the electrical signal according to the present embodiment is, for example, a control signal for controlling the electric motor 72, or power to drive the electric motor 72.

Further, an operation amount detecting unit for detecting the depression operation amount of the brake pedal 12 is not limited to the stroke sensor St, but may be a sensor capable of detecting the depression operation amount of the brake pedal 12. It may be, for example, configured that the hydraulic pressure detected by the pressure sensor Pm as the operation amount detecting unit is converted to the depression operation amount of the brake pedal 12, or the depression operation amount of the brake pedal 12 is detected by an unillustrated depression force sensor.

The slave hydraulic pressure in the second hydraulic chamber 98a and the first hydraulic chamber 98b of the electric brake device 16 is transmitted to the wheel cylinders 32FR, 32RL, 32RR, 32FL of the disk brake mechanisms 30a to 30d via the first and second inlet valves 120, 124 in the open valve state of the VSA device 18, and an intended brake force is applied to each of the wheels by the operations of the wheel cylinders 32FR, 32RL, 32RR, 32FL.

In other words, in the vehicle brake system 10 according to the present embodiment, in a normal state where the electric brake device 16 which functions as a power hydraulic pressure source, the unillustrated control unit which performs by-wire control, and the like, are operational, the brake system of so-called brake-by-wire type is active. The brake system of brake-by-wire type actuates the disk brake mechanisms 30a to 30d by the slave hydraulic pressure (second brake hydraulic pressure) generated by the electric brake device 16, in a state where the communication between the master cylinder 34 for generating the master hydraulic pressure (first brake hydraulic pressure) via the brake pedal 12 depressed by the operator and the disk brake mechanisms 30a to 30d (wheel cylinders 32FR, 32RL, 32RR, 32FL) for braking each of the wheels is shut off by the second shutoff valve 60a and the first shutoff valve 60b. Therefore, the present embodiment can be, for example, preferably applied to vehicles such as an electric vehicle in which a negative pressure due to the internal combustion engine which has been conventionally used does not exist.

On the other hand, in an abnormal state where the electric brake device 16 and the like are inoperative, the brake system of so-called conventional hydraulic type is active. The conventional brake system actuates the disk brake mechanisms 30a to 30d (wheel cylinders 32FR, 32RL, 32RR, 32FL) by transmitting the master hydraulic pressure (first brake hydraulic pressure) generated by the master cylinder device 34 to the disk brake mechanisms 30a to 30d (wheel cylinders 32FR, 32RL, 32RR, 32FL), while the second shutoff valve 60a and the first shutoff valve 60b are respectively in the open valve states and the third shutoff valve 62 is in the closed valve state.

For example, an electric vehicle or a hybrid vehicle, which is equipped with a traction motor (driving motor), can include a regenerative brake which generates a braking force by regenerative power generation with the traction motor. When operating the regenerative brake in such a vehicle, the unillustrated control unit operates the driving motor coupled to at least one of the front and rear axles as a generator, and generates the braking force (regenerative braking force) by the regenerative brake in accordance with the brake operation amount of the brake pedal 12, or the like. When the regenerative braking force is insufficient for the brake operation amount of the brake pedal 12 (the braking force requested by the operator), the control unit drives the electric motor 72 and generates the braking force by the electric brake device 16. In other words, the control unit performs a regenerative cooperative control by the regenerative brake and the hydraulic brake (electric brake device 16). In this case, the control unit can be configured to determine the operation amount of the electric brake device 16 by using a known method. The control unit may be, for example, configured to determine the operation amount of the electric brake device 16 by setting as the target hydraulic pressure the brake hydraulic pressure for generating the braking force, which is obtained by subtracting the regenerative braking force from the braking force (total braking force) determined in accordance with the brake operation amount of the brake pedal 12, in the electric brake device 16, or by setting as the target hydraulic pressure the brake hydraulic pressure for generating the braking force of a predetermined ratio with respect to the total braking force in the electric brake device 16.

When the vehicle brake system 10 configured as described above is mounted on the vehicle, as shown in FIG. 2, the input device 14, the electric brake device 16, and the VSA device 18 are, for example, configured separately to be provided in a state of being appropriately distributed in a housing chamber (power plant housing chamber 2a) in which a power plant 2 of a vehicle 1 is housed, and are mounted respectively on the vehicle. The power plant 2 is a vehicle power plant which generates a power for driving the vehicle 1, and is the internal combustion engine, the traction motor included in the electric vehicle, an integrated unit of the traction motor and the internal combustion engine included in the hybrid vehicle, or the like.

The power plant housing chamber 2a is, for example, in front of the vehicle 1, formed by being partitioned from a living space (cabin 3) of the operator and other occupants with a dashboard 3a. In the power plant housing chamber 2a, unillustrated auxiliary equipments are housed, in addition to the power plant 2, and the vehicle brake system 10 (the input device 14, the electric brake device 16, and the VSA device 18). Further, over the power plant housing chamber 2a, a housing chamber cover 2b is provided to be openable and closable. Furthermore, on the left and right sides of the power plant housing chamber 2a, front side members 7 are extended in a front and rear direction on the left and right sides of the vehicle 1.

Incidentally, it is assumed that each direction of front, rear, up, down, left, and right indicates a front, rear, up, down, left, and right in the vehicle 1. For example, an up and down direction (a vehicle up and down direction) is a vertical direction in the vehicle 1 on a horizontal plane, and a left and right direction is a left and right direction when viewed forward from a rear of the vehicle 1.

The power plant 2 is disposed between the front side members 7 on the left and right in the power plant housing chamber 2a, to be supported by a vibration isolating device 8 secured to an unillustrated sub-frame, and between the power plant 2 and the front side members 7 on the left and right, spaces are formed in the left and right direction. Further, above the power plant 2, a space is formed between the power plant 2 and the housing chamber cover 2b.

Then, in the present embodiment, the input device 14, the electric brake device 16, and the VSA device 18, which are configured separately, are respectively housed in the power plant housing chamber 2a, and the electric brake device 16 is, for example, configured to be mounted such that a part of the cylinder body 82 is disposed in a space formed between the power plant 2 and the housing chamber cover 2b. Further, in the present embodiment, the electric brake device 16 is assumed to be disposed to be shifted to the right side in the power plant housing chamber 2a of the vehicle 1. A position that is shifted to the right side as used herein indicates a position biased to the right side from a center in the left and right direction of the vehicle 1. Further, it is preferable that the electric brake device 16 is disposed at a position where a distance to a right end portion is shorter than a distance to the center in the left and right direction, for example, near or above the front side member 7 which is disposed on the right side of the power plant housing chamber 2a. Furthermore, the electric brake device 16 is preferably configured to be mounted such that a longitudinal direction of the cylinder body 82 is substantially parallel to the front and rear direction of the vehicle 1, and the electric motor 72 is disposed in the rear.

Figure 2:
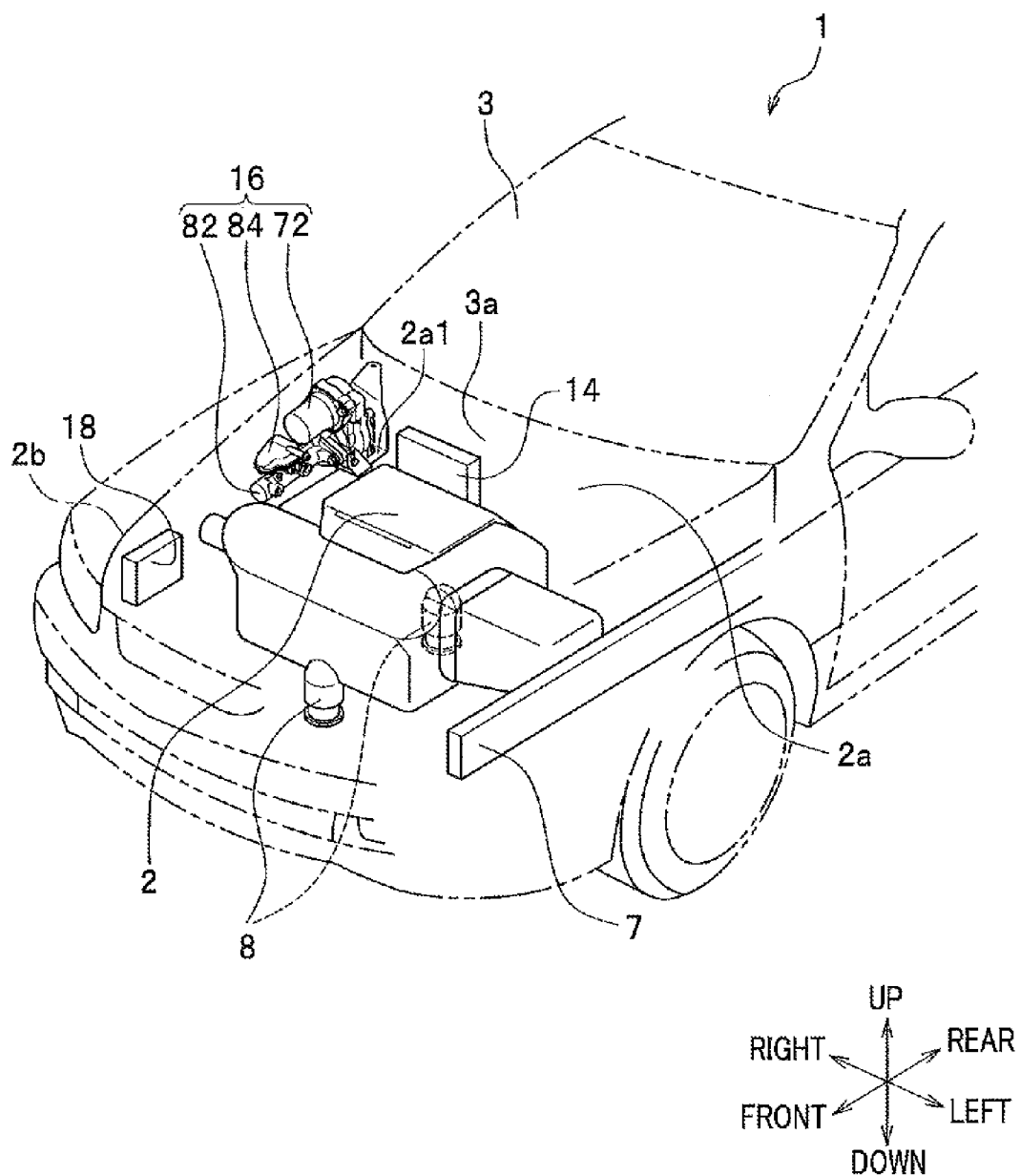
FIG. 2 is a perspective view showing a state in which the electric brake device is disposed in a power plant housing chamber.

Incidentally, in the present embodiment, a state in which the electric motor 72 is disposed above the cylinder body 82 indicates a state in which the electric motor 72 is disposed such that the axis of the output shaft 72b, which is disposed substantially parallel to the axial direction of the second slave piston 88a and first slave piston 88b (hydraulic control pistons) shown in FIG. 1, is above the axis of the second slave piston 88a and first slave piston 88b in the up and down direction of the vehicle, with respect to the left and right direction of the vehicle 1 (see FIG. 2).

Figure 3:
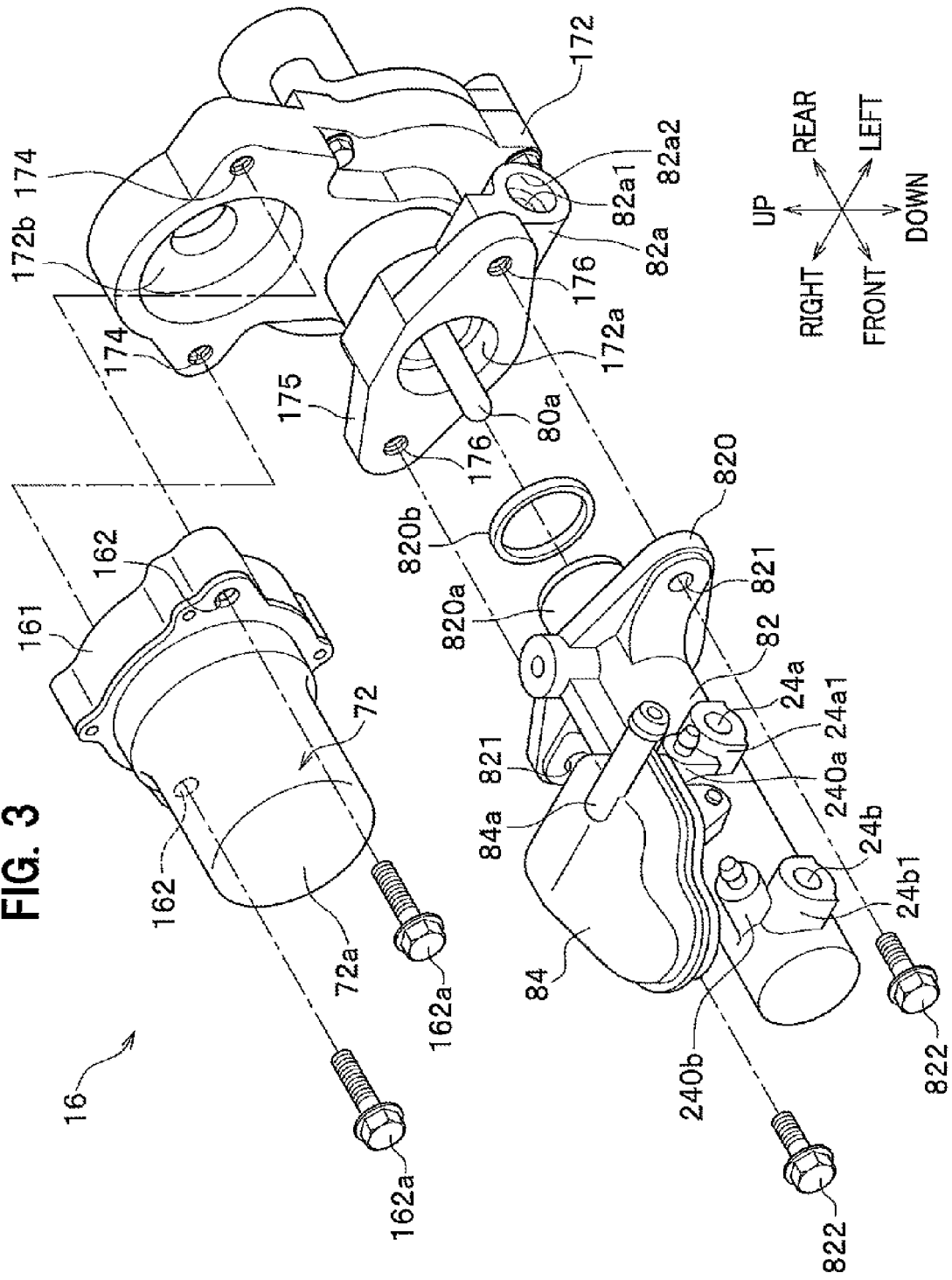
FIG. 3 is an exploded perspective view of the electric brake device.

As shown in FIG. 3, the electric brake device 16 according to the present embodiment is configured such that the cylinder body 82 and the actuator housing 172, which houses the gear mechanism 78 (see FIG. 1) and the ball screw structure 80 (see FIG. 1), are dividable by a dividing plane which is a plane substantially perpendicular to the axis of the cylinder body 82. Then, the electric brake device 16 is configured such that the cylinder body 82 is coupled to the actuator housing 172, and further, the electric motor 72 is mounted.

The cylinder body 82 is coupled to the front of the actuator housing 172. Specifically, an opening portion 172a, through which the ball screw shaft 80a protrudes forward, is open in front of the actuator housing 172, and the cylinder body 82 is coupled to the front of the actuator housing 172 such that a hollow portion (not shown), in which the second slave piston 88a (see FIG. 1) and the first slave piston 88b (see FIG. 1) slide, is in communication with the opening portion 172a.

The actuator housing 172 is, for example, configured such that a flange portion 175 thereof is formed of a periphery of the opening portion 172a which is spread in the left and right direction, and the flange portion 175 has, for example, two screw holes 176 to be open. On the other hand, the cylinder body 82 is configured such that a flange portion 820 thereof is formed of an end portion of the actuator housing 172 side, the end portion being also spread in the left and right direction, and the flange portion 820 has cylinder mounting holes 821 which are open at positions corresponding to the screw holes 176 of the actuator housing 172. Further, a periphery of a hollow portion (not shown) of the cylinder body 82 is extended toward the rear (the side of the actuator housing 172), to form a fitting portion 820a which is fitted into the opening portion 172a of the actuator housing 172. Then, the flange portion 820 of the cylinder body 82 and the flange portion 175 of the actuator housing 172 are arranged to be disposed to each other, and by screwing fastening members 822 such as bolts into the screw holes 176 via the cylinder mounting holes 821 from the cylinder body 82 side, the cylinder body 82 is securely fastened to the actuator housing 172.

At this time, the cylinder body 82 and the actuator housing 172 are preferably configured to be coupled to each other in a liquid-tight manner, by fitting the fitting portion 820a of the cylinder body 82 into the opening portion 172a of the actuator housing 172 via an O-ring 820b having a sealing function. With this configuration, the brake fluid filled in the cylinder body 82 is prevented from leaking out of the connecting portion of the cylinder body 82 and the actuator housing 172 to the outside of the electric brake device 16.

As described above, the cylinder body 82 is coupled to the actuator housing 172 from the front, and the ball screw shaft 80a comes into contact with the second slave piston 88a (see FIG. 1).

Further, the electric motor 72 is, above the cylinder body 82, mounted on the actuator housing 172 such that the axial direction of the output shaft 72b (see FIG. 1) is parallel to the axial direction of the cylinder body 82, or the axial direction of the second slave piston 88a (see FIG. 1) and first slave piston 88b (see FIG. 1).

The second gear 78b (see FIG. 1) is, for example, disposed over the third gear 78c (see FIG. 1), and the actuator housing 172 is extended upward so as to house the second gear 78b and the third gear 78c. Further, the actuator housing 172 has a first gear chamber 172b, in which the first gear 78a is housed engageably with the second gear 78b, and which is in a state of opening forward, over the second gear 78b. Then, the electric motor 72 is mounted on the actuator housing 172 from the front such that the first gear 78a (see FIG. 1) attached to the output shaft 72b (see FIG. 1) is housed in the first gear chamber 172b and meshed with the second gear 78b.

Further, as shown in FIG. 2, when the electric brake device 16 is disposed to be shifted to the right side in the power plant housing chamber 2a of the vehicle 1, as shown in FIG. 3, the inlet port 84a of the second reservoir 84 is open to the left, and the output ports 24b, 24a are formed so as to penetrate bosses 24b1, 24a1 which are formed in a wall thickness convex toward the left side of the cylinder body 82. With this configuration, the output ports 24b, 24a, and the inlet port 84a of the second reservoir 84 are arranged on the left side of the electric brake device 16 which is disposed to be shifted to the right side in the power plant housing chamber 2a of the vehicle 1.

When the electric brake device 16 is disposed to be shifted to the right side in the power plant housing chamber 2a (see FIG. 2), since the left side is an open space, it is possible to secure a large workspace for connecting the piping tube 86 (see FIG. 1) to the inlet port 84a of the second reservoir 84. Similarly, it is possible to secure a large workspace for connecting the fifth piping tube 22e to the output port 24b, and for connecting the second piping tube 22b to the output port 24a. Incidentally, a reference numeral 240b denotes a first air release mechanism (first bleeder) for releasing the air remaining in the first hydraulic chamber 98b (see FIG. 1), and a reference numeral 240a denotes a second air release mechanism (second bleeder) for releasing the air remaining in the second hydraulic chamber 98a (see FIG. 1), and thus the electric brake device 16 according to the present embodiment has two air release mechanisms. The first bleeder and the second bleeder will be described later in detail.

Figure 4:
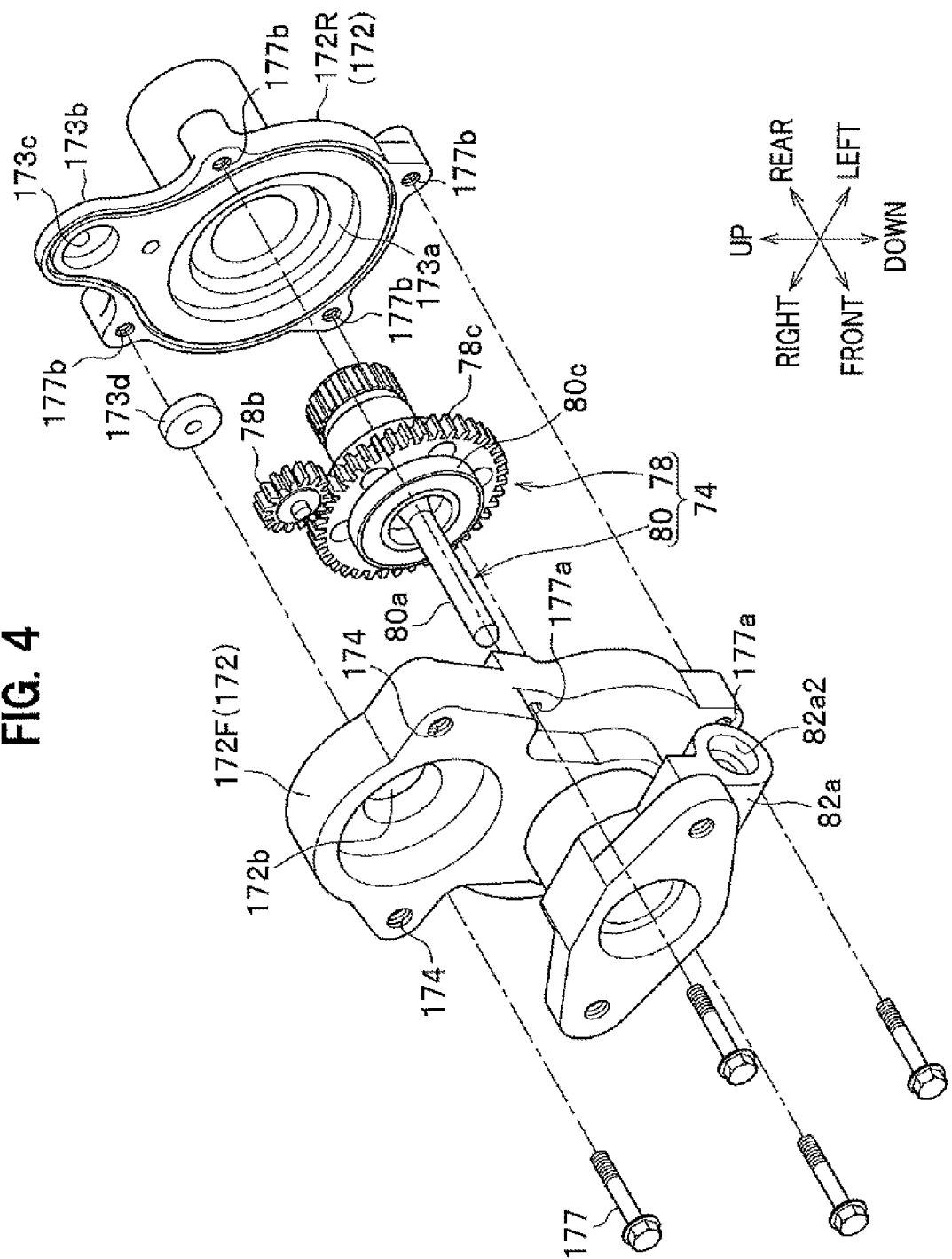
FIG. 4 is an exploded perspective view of an actuator housing.

As shown in FIG. 4, a housing body 172F and a housing cover 172R, which constitute the actuator housing 172 according to the present embodiment, are configured to be separable from each other. The housing body 172F is formed with a plurality of through-holes 177a, through which bolts 177 are inserted, so as to be positioned around a central axis of the second slave piston 88a and first slave piston 88b (see FIG. 1), and the housing cover 172R is formed with a plurality of mounting screw holes 177b at positions corresponding to the through-holes 177a. Then, by screwing the bolts 177 through the through-holes 177a into the mounting screw holes 177b, the housing body 172F and the housing cover 172R are coupled to each other.

The housing cover 172R is formed with the mechanism housing portion 173a, that is, a substantially cylindrical space which is open forward around a central axis of the ball screw shaft 80a. Further, a front surface of the housing cover 172R is extended upward, and is formed with a rear surface portion 173b, which is a rear surface of the first gear chamber 172b formed in the housing body 172F for housing the first gear 78a (see FIG. 1) attached to the electric motor 72. The rear surface portion 173b is, at a position on an axial line of the output shaft 72b (see FIG. 1) of the electric motor 72, formed with a space (bearing portion 173c) for housing a bearing member 173d which rotatably supports the output shaft 72b, in a state of opening forward.

The housing body 172F and the housing cover 172R are combined with each other in the front and rear direction such that the ball screw structure 80 and the third gear 78c are housed in the mechanism housing portion 173a, while the bearing member 173d is housed in the bearing portion 173c, and as described above, the actuator housing 172 is configured such that the housing body 172F and the housing cover 172R are coupled to each other by the bolts 177.

Incidentally, the second gear 78b is configured to be rotatably housed in an unillustrated housing portion formed in the housing body 172F. Then, the rear surface portion 173b is a rear surface of the unillustrated housing portion of the second gear 78b. Further, a reference numeral 80c denotes a bearing member (such as a ball bearing) for rotatably supporting the third gear 78c in the mechanism housing portion 173a, and the mechanism housing portion 173a is configured to house the third gear 78c via the bearing member 80c.

The description is returned to FIG. 3. The structure in which the electric motor 72 is mounted on the actuator housing 172 is not limited. As shown in FIG. 3, the motor casing 72a is, for example, configured such that an end thereof on the actuator housing 172 side is spread around to form a flange portion 161, and on the flange portion 161, motor mounting holes 162 through which fastening members 162a such as bolts are inserted, are open. Further, the actuator housing 172 is configured such that screw holes 174 are open at positions corresponding to the motor mounting holes 162. Then, the electric motor 72 is mounted on the actuator housing 172 from the front (the same side with a side to which the cylinder body 82 is connected) such that the output shaft 72b (see FIG. 1), to which the first gear 78a (see FIG. 1) is attached, is substantially parallel to the axial direction of the cylinder body 82, and the first gear 78a is housed in the first gear chamber 172b and meshed with the second gear 78b (see FIG. 1). At this time, an end portion of the output shaft 72b of the electric motor 72 is rotatably supported by the bearing member 173d (see FIG. 4). Further, the fastening members 162a are screwed into the screw holes 174 through the motor mounting holes 162 from the electric motor 72 side, and the motor casing 72a is securely fastened to the actuator housing 172.

With this configuration, the cylinder body 82 and the electric motor 72 are arranged on the same side of the actuator housing 172. In this manner, the electric brake device 16 according to the present embodiment is configured such that the cylinder body 82 is coupled to the actuator housing 172, and the electric motor 72 is mounted so as to be disposed above the cylinder body 82.

Figure 5:
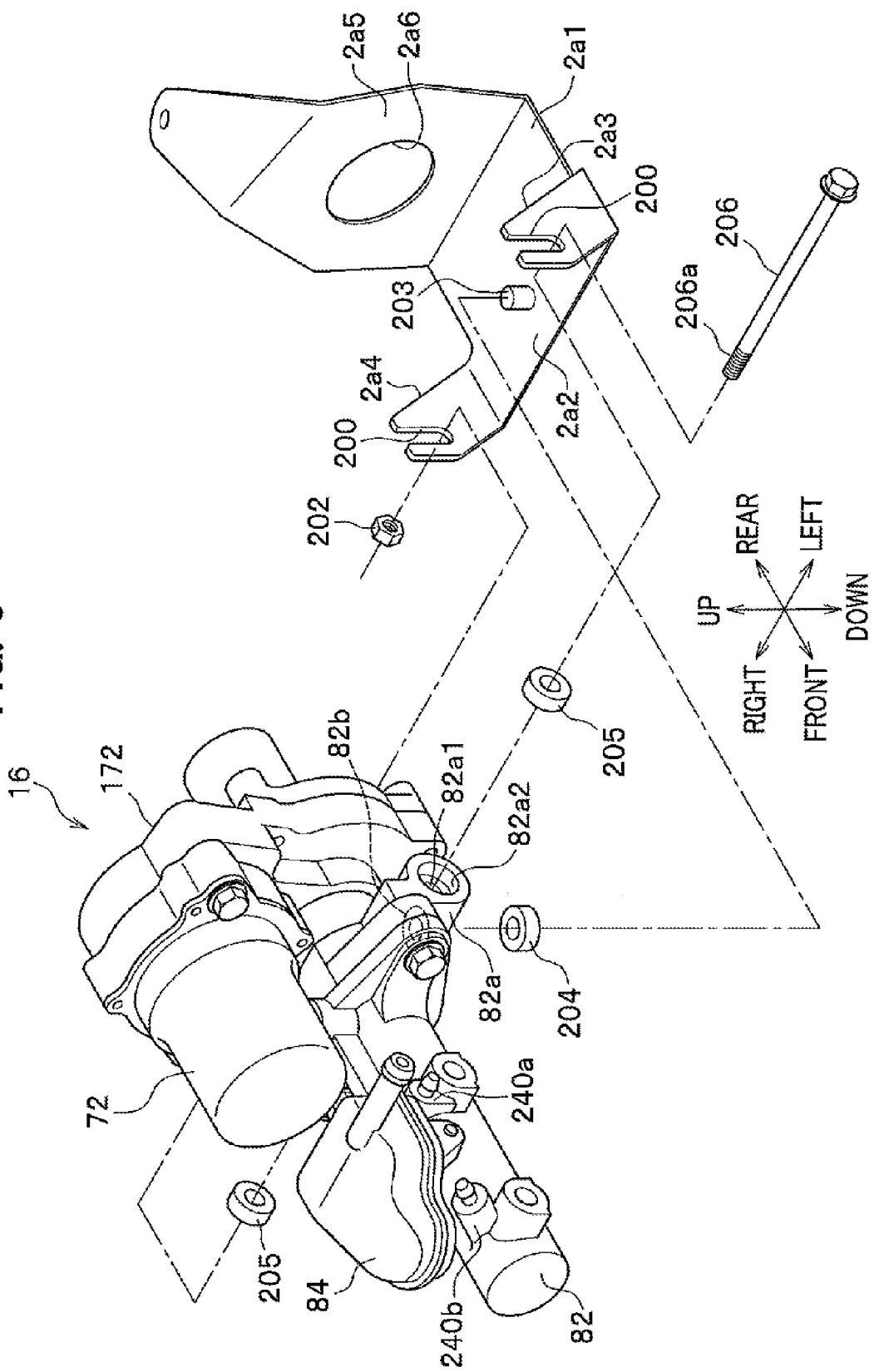
FIG. 5 is a diagram showing an example of a configuration in which the electric brake device is attached to a bracket.

Further, the actuator housing 172 is formed with a mounting portion for mounting the electric brake device 16 on the vehicle 1 (see FIG. 2) via a bracket 2a1 (see FIG. 2). As shown in FIG. 5, the bracket 2a1 according to the present embodiment exhibits a substantial U-shape open upwardly when viewed from the front, and is configured to pinch the actuator housing 172 of the electric brake device 16 from the left and right direction. Then, as shown in FIGS. 4, 5, in the actuator housing 172, a fixing boss 82a to be pinched by the bracket 2a1 is formed to protrude in the left and right direction below the ball screw shaft 80a, and constitutes the mounting portion.

Further, a through-hole, which passes through in the left and right direction the fixing boss 82a protruding in the left and right direction, is formed. The through-hole is an insertion hole in which a mounting-fastening member (bolt member 206) for fixing the actuator housing 172 of the electric brake device 16 to the bracket 2a1 is inserted as described later, and is referred to as a mounting-hole 82a1. Then, both end portions of the mounting-hole 82a1 are enlarged in diameter by being formed with enlarged diameter portions 82a2. As shown in FIG. 2, the electric brake device 16 which has the mounting portion configured as described above is, for example, mounted via the bracket 2a1, on a frame member such as the front side member 7 and the dashboard 3a of the power plant housing chamber 2a. The structure in which the electric brake device 16 is fixed in the power plant housing chamber 2a is not limited thereto, and may be a structure in which the electric brake device 16 is mounted on an unillustrated sub-frame or the like.

As shown in FIG. 5, the bracket 2a1 is configured such that a left wall portion 2a3 and a right wall portion 2a4 are erected on the left and right sides of a bottom portion 2a2. Then, the left wall portion 2a3 and the right wall portion 2a4 are configured to pinch the fixing boss 82a formed in the actuator housing 172 from the left and right direction. In the left wall portion 2a3 and the right wall portion 2a4, at positions corresponding to the mounting-hole 82a1 of the electric brake device 16, for example, notch portions 200 open upward are formed, and when the fixing boss 82a is pinched by the left wall portion 2a3 and the right wall portion 2a4, the notch portion 200 of the left wall portion 2a3, the mounting-hole 82a1, and the notch portion 200 of the right wall portion 2a4 are configured to be disposed in a straight line.

Then, annular mount-rubbers 205 as buffer members are fitted into the enlarged diameter portions 82a2, and further, for example, a bolt member 206 is inserted in the order of the notch portion 200 of the left wall portion 2a3, the mount-rubber 205, the mounting-hole 82a1, the mount-rubber 205, and the notch portion 200 of the right wall portion 2a4, from the outside of the left wall portion 2a3. The bolt member 206 is preferably formed with a threaded portion 206a, which is screwed with a nut member 202, at least at a tip end portion thereof, and by the bolt member 206, which passes through the notch portion 200 of the right wall portion 2a4, being screwed with the nut member 202, the electric brake device 16 may be configured to be secured to the bracket 2a1.

Note that, the structure in which the electric brake device 16 is secured to the bracket 2a1 is not limited thereto. For example, the electric brake device 16 may be configured to be secured to the bracket 2a1 by inserting screw members respectively from the outside of the left wall portion 2a3 and the right wall portion 2a4, which pinch the fixing boss 82a.

Further, the bracket 2a1 may be formed with a rear wall portion 2a5 which is erected from a rear end of the bottom portion 2a2. The rear wall portion 2a5 is, for example, a fixed portion to be fixed to the frame member such as the front side member 7 (see FIG. 2) and the dashboard 3a (see FIG. 2) of the vehicle 1. Further, a through-hole 2a6 through which a rear end portion of the cylinder body 82 passes may be formed in the rear wall portion 2a5.

Incidentally, a reference numeral 203 denotes a projecting portion for positioning the electric brake device 16, and the projecting portion is configured to be engaged with an engaging-hole 82b formed under the actuator housing 172, via an annular mount-rubber 204 which is a buffer member. Specifically, the projection portion 203 is fitted into a central through-hole of the mount-rubber 204, and is engaged with the engaging-hole 82b together with the mount-rubber 204.

By securing the above-described bracket 2a1, for example, to the front side member 7 (see FIG. 2) or the dashboard 3a (see FIG. 2) in the power plant housing chamber 2a (see FIG. 2), the electric brake device 16 is provided in the power plant housing chamber 2a.

The electric brake device 16 (see FIG. 5), which is configured as described above and provided in the power plant housing chamber 2a (see FIG. 2), is filled with the brake fluid in the cylinder body 82 (see FIG. 1) as described above, and the brake fluid is enclosed in the cylinder body 82 by the slave cup seals 90a, 90b (see FIG. 1) and the guide piston 90c (see FIG. 1).

However, when an operation of enclosing the brake fluid in the first hydraulic system 70b (see FIG. 1), the second hydraulic system 70a (see FIG. 1), or the like, is performed, for example, during production of the electric brake device 16 (see FIG. 1), the air is mixed into these hydraulic systems, and the mixed air remains in the cylinder body 82 (see FIG. 1) in some cases. Conventionally, the air mixed in the hydraulic system (the first hydraulic system 70b, the second hydraulic system 70a, or the like) of the vehicle brake system 10 (see FIG. 1) is released from the air release mechanism (bleeder) included in the caliper (wheel cylinders 32FR, 32RL, 32RR, 32FL) or the like of the disk brake mechanisms 30a to 30d.

However, as shown in FIG. 1, if the vehicle brake system 10 generates the hydraulic pressure by operating the first slave piston 88b and the second slave piston 88a, which are housed in the cylinder body 82, by the electric motor 72, when releasing the air remaining in the cylinder body 82, an operation of operating the first slave piston 88b and the second slave piston 88a by supplying power to the electric motor 72 is required, and the air remaining in the cylinder body 82 cannot be easily released.

Therefore, a structure in which the air remaining in the cylinder body 82 can be easily released is preferable, and in the present embodiment, the cylinder body 82 is configured to include the air release mechanism (bleeder) for releasing the air. Specifically, the cylinder body 82 is configured to be formed with the first bleeder 240b and the second bleeder 240a. The first bleeder 240b is formed with a first bleeder-hole 243b1, through which the first hydraulic chamber 98b (see FIG. 1) of the cylinder body 82 and the outside are in communication with each other as shown in FIG. 6, and a first bleeder cap 244b shown in FIG. 7A is attached to the first bleeder-hole 243b1. The second bleeder 240a is formed with a second bleeder-hole 243a1, through which the second hydraulic chamber 98a (see FIG. 1) of the cylinder body 82 and the outside are in communication with each other as shown in FIG. 6B, and a second bleeder cap 244a shown in FIG. 7B is attached to the second bleeder-hole 243a1.

Figure 6A:
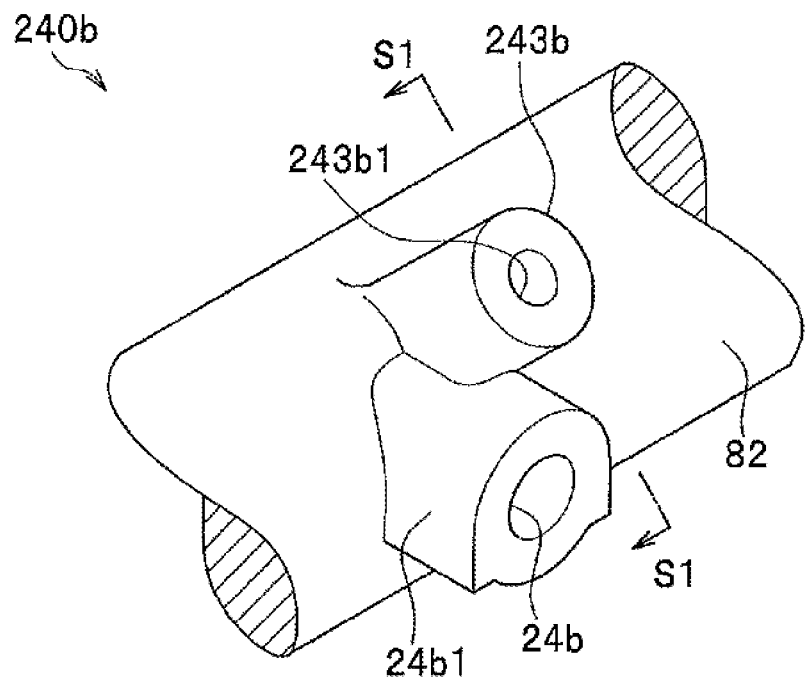
FIG. 6A is a perspective view of a first bleeder boss.
Figure 6B:
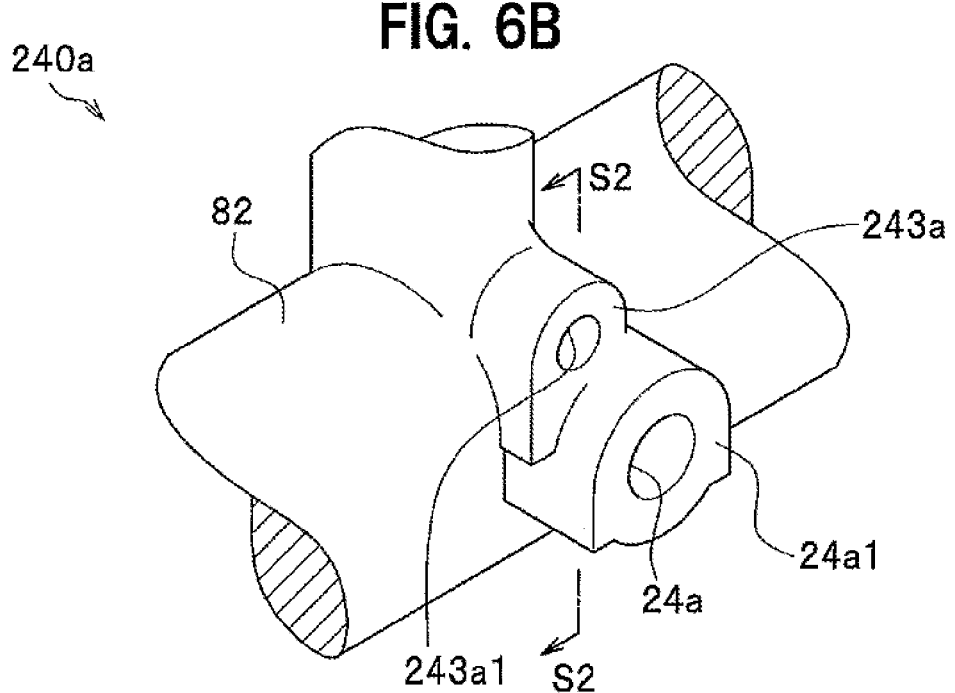
FIG. 6B is a perspective view of a second bleeder boss.
Figure 7A:
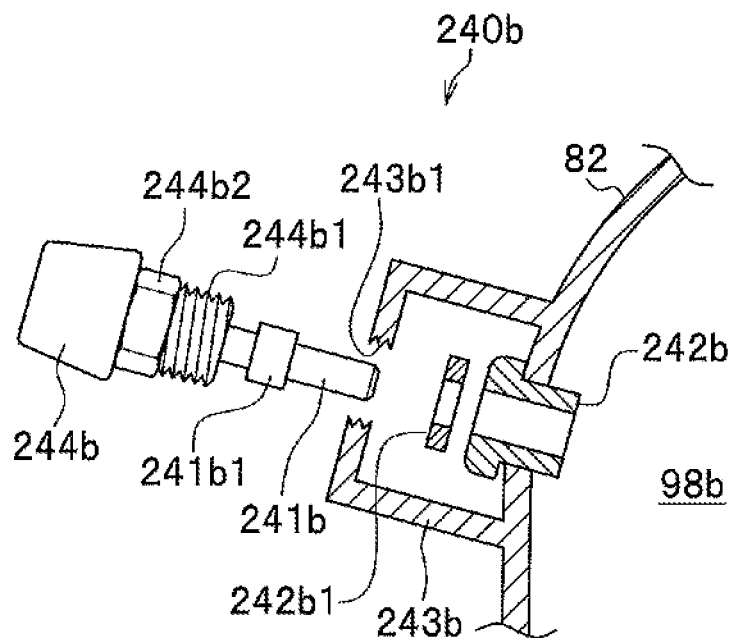
FIG. 7A is a cross-sectional view taken along a line S1-S1 in FIG. 6A.
Figure 7B:
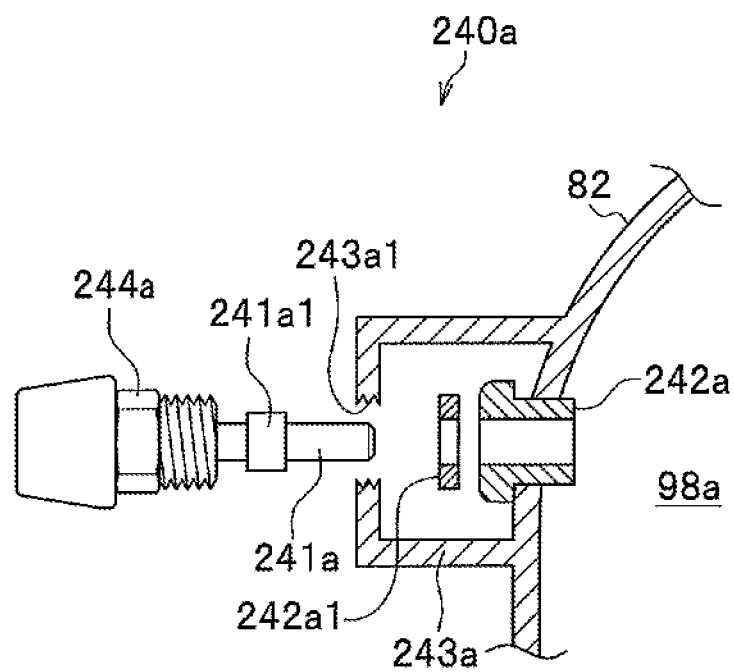
FIG. 7B is a cross-sectional view taken along a line S2-S2 in FIG. 6B.

Further, as shown in FIGS. 6A, 6B, the first bleeder 240b and the second bleeder 240a are preferably disposed on the upper side of the cylinder body 82 where the air tends to remain. For example, as shown in FIG. 6A, the first bleeder 240b may be configured such that a hollow first bleeder boss 243b is formed to be overlapped with the boss 24b1 at a position over the boss 24b1 of the output port 24b which is formed as a thickness portion of the cylinder body 82, and the first bleeder-hole 243b1 is formed to pass through the top portion of the first bleeder boss 243b. Similarly, as shown in FIG. 6B, the second bleeder 240a may be configured such that a hollow second bleeder boss 243a is formed to be overlapped with the boss 24a1 at a position over the boss 24a1 of the output port 24a, and the second bleeder-hole 243a1 is formed to pass through the top portion of the second bleeder boss 243a.

As shown in FIG. 7A, the first bleeder boss 243b is formed in a hollow obliquely upward on the outside of the cylinder body 82, and includes a first bleeder port 242b which penetrates the cylinder body 82 therein. Further, the first bleeder-hole 243*b*1 is formed to penetrate the top portion of the first bleeder boss 243*b*, and to which the first bleeder cap 244*b* is attached.

One end of the first bleeder cap 244*b* is inserted into the first bleeder-hole 243*b*1, and has a threaded portion 244*b*1 (male thread) which is screwed into a thread (female thread) formed in the first bleeder-hole 243*b*1, and the first bleeder cap 244*b* may be configured to be attached to the first bleeder-hole 243*b*1 by screwing. Further, the first bleeder cap 244*b* may be configured to be formed with a nut portion 244*b*2 (hex nut) for facilitating attachment and detachment of the first bleeder cap 244*b* on the periphery thereof. With this configuration, the first bleeder cap 244*b* can be screwed into the first bleeder boss 243*b*.

Further, the first bleeder port 242*b* is a tubular member, and is configured to be opened and closed by a first bleeder valve 241*b*. The first bleeder valve 241*b* is preferably formed integrally with the first bleeder cap 244*b*. For example, the first bleeder valve 241*b* is a rod-shaped portion extending toward the first bleeder port 242*b* from the first bleeder cap 244*b*, and is preferably configured to be fitted into the first bleeder port 242*b* and close the first bleeder port 242*b* when the first bleeder cap 244*b* is attached to the first bleeder boss 243*b*. By the above-described integrated structure of the first bleeder valve 241*b* and the first bleeder cap 244*b*, it is possible to increase the size of the first bleeder valve 241*b* and the first bleeder cap 244*b*, thereby preventing loss caused by dropping or the like.

Further, the first bleeder valve 241*b* may be configured to be formed with an enlarged diameter portion 241*b*1 in a part thereof, and such that the enlarged diameter portion 241*b*1 is in contact with an end portion of the first bleeder port 242*b* when the first bleeder valve 241*b* is fitted into the first bleeder port 242*b*. Furthermore, if the enlarged diameter portion 241*b*1 and the end portion of the first bleeder port 242*b* are configured to be in close contact with each other by a packing 242*b*1 made of an elastic member, the first bleeder port 242*b* can be closed in a liquid-tight state by the first bleeder valve 241*b*. Incidentally, the packing 242*b*1 may be attached to the first bleeder valve 241*b* or the end portion of the first bleeder port 242*b*. This configuration can prevent loss of the packing 242*b*1 which is a very small component. In addition, the operability of opening and closing the first bleeder valve 241*b* is also improved.

Further, the first bleeder cap 244*b* and the first bleeder valve 241*b* may be configured to be formed separately. In this case, it is preferably configured that a part of the first bleeder valve 241*b* is exposed to the outside of the first bleeder boss 243*b* in a state where the first bleeder cap 244*b* is removed, and the first bleeder valve 241*b* is easily removable.

As described above, the first bleeder 240*b* according to the present embodiment is configured to include the first bleeder port 242*b* through which the first hydraulic chamber 98*b* and the outside of the cylinder body 82 are in communication with each other via the first bleeder-hole 243*b*1, and the first bleeder valve 241*b* for opening and closing the first bleeder port 242*b*. Then, it is configured that a closed state and an open state are manually switchable to each other by the operator. The closed state is a state in which the first bleeder cap 244*b* is attached to the first bleeder boss 243*b*, and the first bleeder valve 241*b* closes the first bleeder port 242*b*, so that the first hydraulic chamber 98*b* and the outside of the cylinder body 82 are not in communication with each other, and the open state is a state in which the first bleeder cap 244*b* is removed from the first bleeder boss 243*b*, and the first bleeder valve 241*b* opens the first bleeder port 242*b*, so that the first hydraulic chamber 98*b* and the outside of the cylinder body 82 are in communication with each other.

Further, the second bleeder 240*a* may have the same structure as that of the first bleeder 240*b*. As shown in FIG. 7B, the second bleeder boss 243*a* is formed in a hollow toward the lateral direction (for example, the left side) on the outside of the cylinder body 82, and includes a second bleeder port 242*a* which penetrates the cylinder body 82 therein. Further, the second bleeder-hole 243*a*1 is formed to penetrate the top portion of the second bleeder boss 243*a*, and to which the second bleeder cap 244*a* is threadedly attached.

Further, the second bleeder valve 241*a*, which is a rod-shaped member extending toward the second bleeder port 242*a* from the second bleeder cap 244*a*, is configured to open and close the second bleeder port 242*a*. Then, if the enlarged diameter portion 241*a*1, which is formed on a part of the second bleeder valve 241*a*, and an end portion of the second bleeder port 242*a* are configured to be in close contact with each other by a packing 242*a*1 made of the elastic member, the second bleeder port 242*a* can be closed in a liquid-tight state by the second bleeder valve 241*a*. Incidentally, the packing 242*a*1 may be attached to the second bleeder valve 241*a* or the end portion of the second bleeder port 242*a*. This configuration can prevent loss of the packing 242*a*1 which is a very small component. In addition, the operability of opening and closing the second bleeder valve 241*a* is also improved.

As described above, the second bleeder 240*a* according to the present embodiment is configured to include the second bleeder port 242*a* through which the second hydraulic chamber 98*a* and the outside of the cylinder body 82 are in communication with each other via the second bleeder-hole 243*a*1, and the second bleeder valve 241*a* for opening and closing the second bleeder port 242*a*. Then, it is configured that a closed state and an open state are manually switchable to each other by the operator. The closed state is a state in which the second bleeder cap 244*a* is attached to the second bleeder boss 243*a*, and the second bleeder valve 241*a* closes the second bleeder port 242*a*, so that the second hydraulic chamber 98*a* and the outside of the cylinder body 82 are not in communication with each other, and the open state is a state in which the second bleeder cap 244*a* is removed from the second bleeder boss 243*a*, and the second bleeder valve 241*a* opens the second bleeder port 242*a*, so that the second hydraulic chamber 98*a* and the outside of the cylinder body 82 are in communication with each other.

With the configuration in which the cylinder body 82 includes the first bleeder 240*b* and the second bleeder 240*a* as shown in FIGS. 7A, 7B, the air remaining in the cylinder body 82 can be released without supplying power to the electric motor 72 (see FIG. 1). Specifically, as shown in FIG. 7*a*, the operator who releases the air remaining in the cylinder body 82 removes the first bleeder valve 241*b* from the first bleeder port 242*b* by removing the first bleeder cap 244*b* from the first bleeder boss 243*b*, and opens the first bleeder port 242*b*. At this time, it is the open state in which the first hydraulic chamber 98*b* and the outside of the cylinder body 82 are in communication with each other. And the operator performs depression operation of the brake pedal 12 (see FIG. 1) several times.

In a state where the vehicle 1 (see FIG. 1) is not started (that is, a state where an ignition switch is OFF), the first shut-off valve 60*b* (see FIG. 1) is in an open state, and the master hydraulic pressure generated in the first pressure chamber 56*b* (see FIG. 1) of the master cylinder 34 by the depression operation of the brake pedal 12 (see FIG. 1) is transmitted to the connection point A2 (see FIG. 1) via the first hydraulic path 58b (see FIG. 1) and the fourth piping tube 22d (see FIG. 1). The master hydraulic pressure transmitted to the connection point A2 is supplied to the VSA device 18 (see FIG. 1) from the inlet port 26b (see FIG. 1) via the sixth piping tube 22f (see FIG. 1), while being supplied to the first hydraulic chamber 98b of the cylinder body 82 from the output port 24b (see FIG. 1) via the fifth piping tube 22e (see FIG. 1).

Then, the pressure in the first hydraulic chamber 98b of the cylinder body 82 is boosted by the master hydraulic pressure, so that the air remaining in the first hydraulic chamber 98b is pushed out through the first bleeder port 242b and released to the outside of the cylinder body 82. In this manner, without supplying power to the electric motor 72 (see FIG. 1), by the depression operation of the brake pedal 12 (see FIG. 1), the air remaining in the first hydraulic chamber 98b can be released.

Incidentally, the air remaining in the second hydraulic chamber 98a (see FIG. 1) of the cylinder body 82 can also be released in the similar operation. In other words, as shown in FIG. 7b, the operator removes the second bleeder valve 241a from the second bleeder port 242a by removing the second bleeder cap 244a from the second bleeder boss 243a, and opens the second bleeder port 242a. At this time, it is the open state in which the second hydraulic chamber 98a and the outside of the cylinder body 82 are in communication with each other. And the operator has only to perform depression operation of the brake pedal 12 (see FIG. 1) several times.

As described above, in a state where the vehicle 1 (see FIG. 1) is not started, the second shut-off valve 60a (see FIG. 1) is in an open state, and the master hydraulic pressure generated in the second pressure chamber 56a (see FIG. 1) of the master cylinder 34 by the depression operation of the brake pedal 12 (see FIG. 1) is transmitted to the connection point A1 (see FIG. 1) via the second hydraulic path 58a (see FIG. 1) and the first piping tube 22a (see FIG. 1). The master hydraulic pressure transmitted to the connection point A1 is supplied to the VSA device 18 (see FIG. 1) from the inlet port 26a (see FIG. 1) via the third piping tube 22c (see FIG. 1), while being supplied to the second hydraulic chamber 98a (see FIG. 1) of the cylinder body 82 from the output port 24a (see FIG. 1) via the fourth piping tube 22d (see FIG. 1).

Then, the pressure in the second hydraulic chamber 98a of the cylinder body 82 is boosted by the master hydraulic pressure, so that the air remaining in the second hydraulic chamber 98a is pushed out through the second bleeder port 242a and released to the outside of the cylinder body 82. In this manner, without supplying power to the electric motor 72 (see FIG. 1), by the depression operation of the brake pedal 12 (see FIG. 1), the air remaining in the second hydraulic chamber 98a can be released. Note that, it is also possible to simultaneously release the air remaining in the first hydraulic chamber 98b and the air remaining in the second hydraulic chamber 98a.

Further, in the present embodiment, the cylinder body 82 is configured to include the first bleeder 240b and the second bleeder 240a on the left side thereof, as shown in FIG. 3. As shown in FIG. 2, the electric brake device 16 in the present embodiment is disposed to be shifted to the right side in the power plant housing chamber 2a of the vehicle 1. Therefore, with the configuration in which the first bleeder 240b and the second bleeder 240a are disposed on the left side of the cylinder body 82, it is possible to secure a large work space for the operation of releasing the air remaining in the cylinder body 82.

Further, as shown in FIG. 3, when the first bleeder 240b is, for example, formed under the front of the second reservoir 84 (when the second reservoir 84 is disposed over the first bleeder 240b), it is possible to prevent the second reservoir 84 from covering a space over the first bleeder 240b (for example, a space over the first bleeder-hole 243b1) by allowing the second reservoir 84 to have a notched shape by cutting the front left thereof. In other words, in the present embodiment, the second reservoir 84, which is disposed over the first bleeder 240b, is configured not to cover the space over the first bleeder 240b by having the notch formed by cutting the front left portion thereof which is over the first bleeder 240b.

Note that, the shape of the second reservoir 84, which does not cover the space over the first bleeder 240b, is not limited to the shape having the notch formed by cutting the front left thereof. The second reservoir 84 may be, for example, configured not to cover the space over the first bleeder 240b by shortening the length of the second reservoir 84 in the longitudinal direction of the cylinder body 82. In another configuration, the second reservoir 84 may be configured not to cover the space over the first bleeder 240b by mounting the second reservoir 84 on a position shifted to the side (the right side in the present embodiment) on which the first bleeder 240b is not formed. Further, the second reservoir 84 may have a shape not to cover the space over the second bleeder 240a.

Further, the first bleeder 240b may be configured to face upward. Specifically, as shown in FIG. 6A, the first bleeder-hole 243b1 of the first bleeder boss 243b is configured to be formed to face upward. With this configuration, the first bleeder cap 244b (see FIG. 7A) and the first bleeder valve 241b (see FIG. 7A) are attached and detached in the upper direction, and the first bleeder cap 244b and the first bleeder valve 241b are easily attached and detached by the operator. Therefore, the operability of releasing the air remaining in the cylinder body 82 is improved. Note that, if an open space is formed over the second bleeder 240a, the second bleeder 240a may be configured to be formed to face upward.

Further, it is not limited to the structure in which the first bleeder boss 243b is formed in the vicinity of the boss 24b1 formed with the output port 24b, and the first bleeder boss 243b may be formed at a position where the first hydraulic chamber 98b and the outside of the cylinder body 82 are communicable with each other through the first bleeder port 242b which is equipped in the first bleeder boss 243b. Similarly, it is not limited to the structure in which the second bleeder boss 243a is formed in the vicinity of the boss 24a1 formed with the output port 24a, and the second bleeder boss 243a may be formed at a position where the second hydraulic chamber 98a and the outside of the cylinder body 82 are communicable with each other through the second bleeder port 242a which is equipped in the second bleeder boss 243a.

Figure 8:
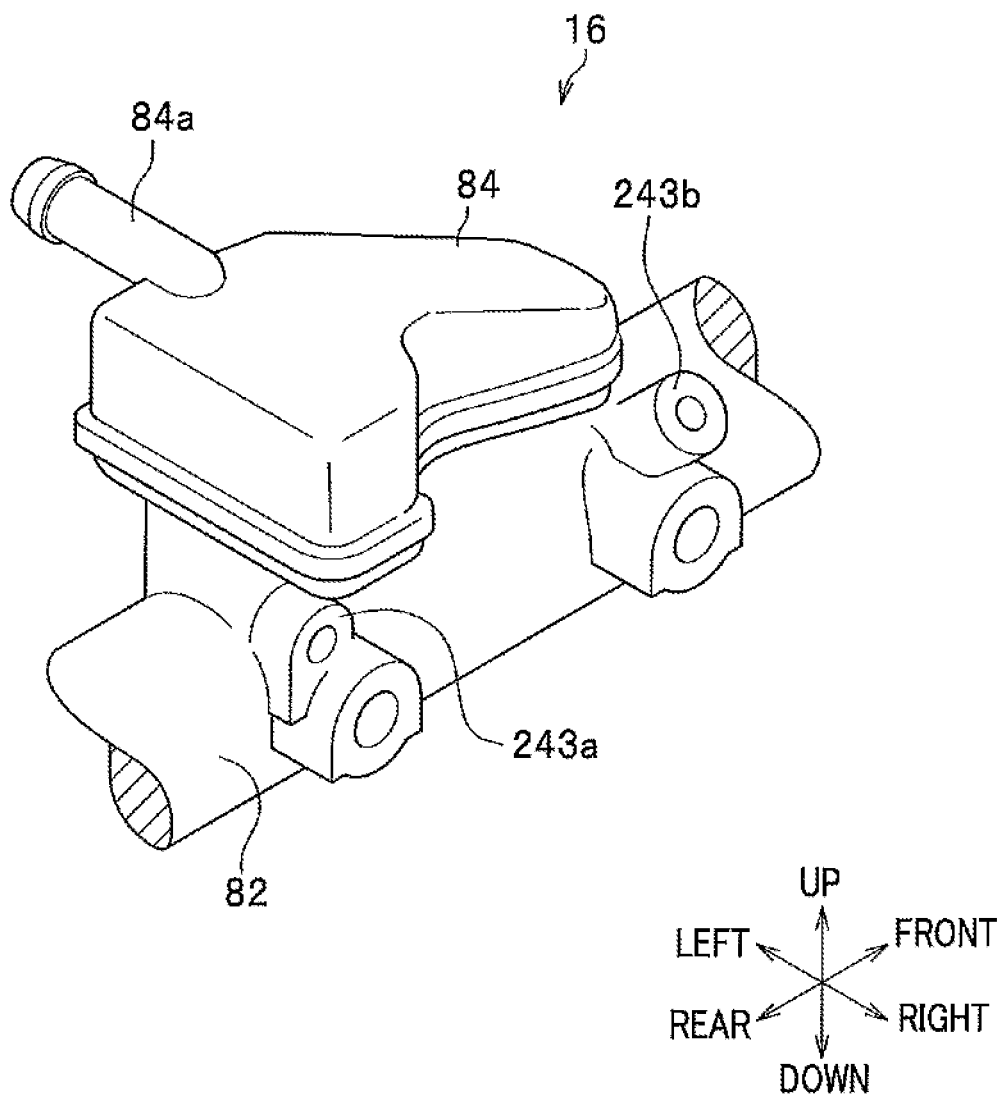
FIG. 8 is a perspective view of the first bleeder and the second bleeder which are formed on the right side of the cylinder body.

Further, the first bleeder 240b and the second bleeder 240a may be configured to be formed on the right side of the cylinder body 82. In another method, as shown in FIG. 8, the first bleeder boss 243b and the second bleeder boss 243a may be configured to be formed on the right side of the cylinder body 82. With this configuration, for example, if the mounting position of the electric brake device 16 is changed to be configured to secure a large work space on the right side of the cylinder body 82, the first bleeder 240b and the second bleeder 240a can be easily formed on the right side of the cylinder body 82. For example, if the electric brake device 16 (see FIG. 2) is disposed to be shifted to the left side of the vehicle 1 (see FIG. 2), a large work space can be easily secured on the right side. In such a case, by forming the first bleeder 240b and the second bleeder 240a on the right side of the cylinder body 82, the release operation of the air remaining in the cylinder body 82 can be facilitated.

REFERENCE SIGNS LIST

1: vehicle
2a: power plant housing chamber
10: vehicle brake system (brake device)
12: brake pedal (brake operation unit)
16: electric brake device (slave cylinder)
32FR, 32RL, 32RR, 32FL: wheel cylinder
34: master cylinder
70a: second hydraulic system (hydraulic system)
70b: first hydraulic system (hydraulic system)
72: electric motor (motor)
82: cylinder body
84: second reservoir (reserve tank)
88a: second slave piston (hydraulic control piston)
88b: first slave piston (hydraulic control piston)
98a: second hydraulic chamber (brake hydraulic chamber)
98b: first hydraulic chamber (brake hydraulic chamber)
240a: second bleeder (second air release mechanism)
240b: first bleeder (first air release mechanism)

The invention claimed is:

1. A brake device comprising:
a master cylinder that generates a brake hydraulic pressure in accordance with an operation amount of a brake operation unit by an operator;
a slave cylinder that houses a hydraulic control piston operated by a driving force of an electric motor to be driven in accordance with the operation amount of the brake operation unit, and has a cylinder body formed with a brake hydraulic chamber for generating a brake hydraulic pressure through an operation of the hydraulic control piston; and
a hydraulic system that connects, to the slave cylinder, a wheel cylinder for generating a braking force by the brake hydraulic pressure generated in the master cylinder or by the brake hydraulic pressure generated in the slave cylinder,
wherein the cylinder body includes an air release mechanism which is configured to be switchable between an open state in which the brake hydraulic chamber is in communication with an exterior of the cylinder body and a closed state in which the brake hydraulic chamber is not in communication with the exterior of the cylinder body,
wherein a reservoir for storing the brake fluid to be supplied to the brake hydraulic chamber is disposed above the air release mechanism, and
wherein the reservoir has a shape with a notch over the air release mechanism.

2. The brake device according to claim 1,
wherein the hydraulic system is composed of two hydraulic systems,
wherein the hydraulic control piston includes a first slave piston and a second slave piston which are connected in series,
wherein the brake hydraulic chamber includes a first hydraulic chamber which generates a brake hydraulic pressure through an operation of the first slave piston and supplies the brake hydraulic pressure to one of the hydraulic systems, and a second hydraulic chamber which generates a brake hydraulic pressure through an operation of the second slave piston and supplies the brake hydraulic pressure to the other of the hydraulic systems, and
wherein the air release mechanism includes a first air release mechanism which is switchable between the closed state and the open state of the first hydraulic chamber, and a second air release mechanism which is switchable between the closed state and the open state of the second hydraulic chamber.

3. The brake device according to claim 1,
wherein the slave cylinder is disposed to be shifted to one side of a left side and a right side in a power plant housing chamber of a vehicle, and
wherein the air release mechanism is formed on the other side of the left side and the right side of the cylinder body.

4. The brake device according to claim 1,
wherein the pressure in the brake hydraulic chamber is boosted by supplying the brake hydraulic pressure generated in the master cylinder to the brake hydraulic chamber, and
wherein the air remaining in the brake hydraulic chamber with the air release mechanism in an open state is released to the exterior of the cylinder body from the air release mechanism.

5. The brake device according to claim 3,
wherein the pressure in the brake hydraulic chamber is boosted by supplying the brake hydraulic pressure generated in the master cylinder to the brake hydraulic chamber, and
wherein the air remaining in the brake hydraulic chamber with the air release mechanism in an open state is released to the exterior of the cylinder body from the air release mechanism.

\* \* \* \* \*